US012527311B1

(12) United States Patent
Suteerawanit

(10) Patent No.: US 12,527,311 B1
(45) Date of Patent: Jan. 20, 2026

(54) COMPOSABLE INSERTS FOR DIY TRAPS

(71) Applicant: Nick Suteerawanit, Laguna Woods, CA (US)

(72) Inventor: Nick Suteerawanit, Laguna Woods, CA (US)

( * ) Notice: Subject to any disclaimer, the term of this patent is extended or adjusted under 35 U.S.C. 154(b) by 0 days.

(21) Appl. No.: 19/360,663

(22) Filed: Oct. 16, 2025

(51) Int. Cl.
  *A01M 23/08* (2006.01)
  *A01K 69/08* (2006.01)

(52) U.S. Cl.
  CPC .............. *A01M 23/08* (2013.01); *A01K 69/08* (2013.01)

(58) Field of Classification Search
  CPC ................................ A01M 23/08; A01K 69/08
  See application file for complete search history.

(56) References Cited

U.S. PATENT DOCUMENTS

| | | | | |
|---|---|---|---|---|
| 3,320,692 A * | 5/1967 | Hellen | ................. | A01M 23/16 43/131 |
| 3,885,341 A * | 5/1975 | Kuchenbecker | ...... | A01M 1/106 43/65 |
| 4,873,787 A * | 10/1989 | Schneidmiller | ......... | A01M 1/02 43/118 |
| 5,309,668 A * | 5/1994 | Barton | .................... | A01M 1/10 43/121 |
| 6,112,452 A * | 9/2000 | Campbell | ................ | A01M 1/04 43/107 |
| 6,158,165 A * | 12/2000 | Wilson | .................. | A01M 1/103 43/107 |
| 7,503,142 B1 * | 3/2009 | Uhl | ........................ | A01M 1/106 141/331 |
| 8,677,678 B2 * | 3/2014 | Schneidmiller | ....... | A01M 1/106 43/122 |
| 9,433,202 B1 * | 9/2016 | Roberts | ................. | A01M 1/103 |
| 10,280,058 B1 * | 5/2019 | Pickett | ...................... | B67B 7/26 |
| 2005/0198892 A1 * | 9/2005 | Lin | ........................ | A01K 69/06 43/65 |
| 2018/0325089 A1 * | 11/2018 | Willert | .................. | A01M 1/106 |
| 2020/0296952 A1 * | 9/2020 | Kinney | ................. | A01M 23/08 |
| 2021/0400949 A1 * | 12/2021 | Hester | ................... | A01M 23/08 |

FOREIGN PATENT DOCUMENTS

KR  101442085 B1 * 9/2014 ............. A01K 75/00

* cited by examiner

*Primary Examiner* — Richard G Davis
(74) *Attorney, Agent, or Firm* — AGK Patent & Trademark Law; Philip Y Kim

(57) ABSTRACT

A composable insert system for converting a standard container, such as a storage tote, into a Do-It-Yourself (DIY) live trap. The system includes three modular components: a main flange body with an external thread and receiving slots, a plurality of individual thorny spike elements with bases that snap into the slots, and a lock nut. When assembled through an aperture cut into a container, the flange body is secured by the lock nut, and the attached spikes form a conical, one-way passage into the container's interior. The modular design allows for cost-effective manufacturing via simple molds and provides a versatile, scalable solution for users to create customized traps of various sizes for pests like rodents and fish. For aquatic use, the resulting trap can be made buoyant with foam or weighted to sink.

20 Claims, 25 Drawing Sheets

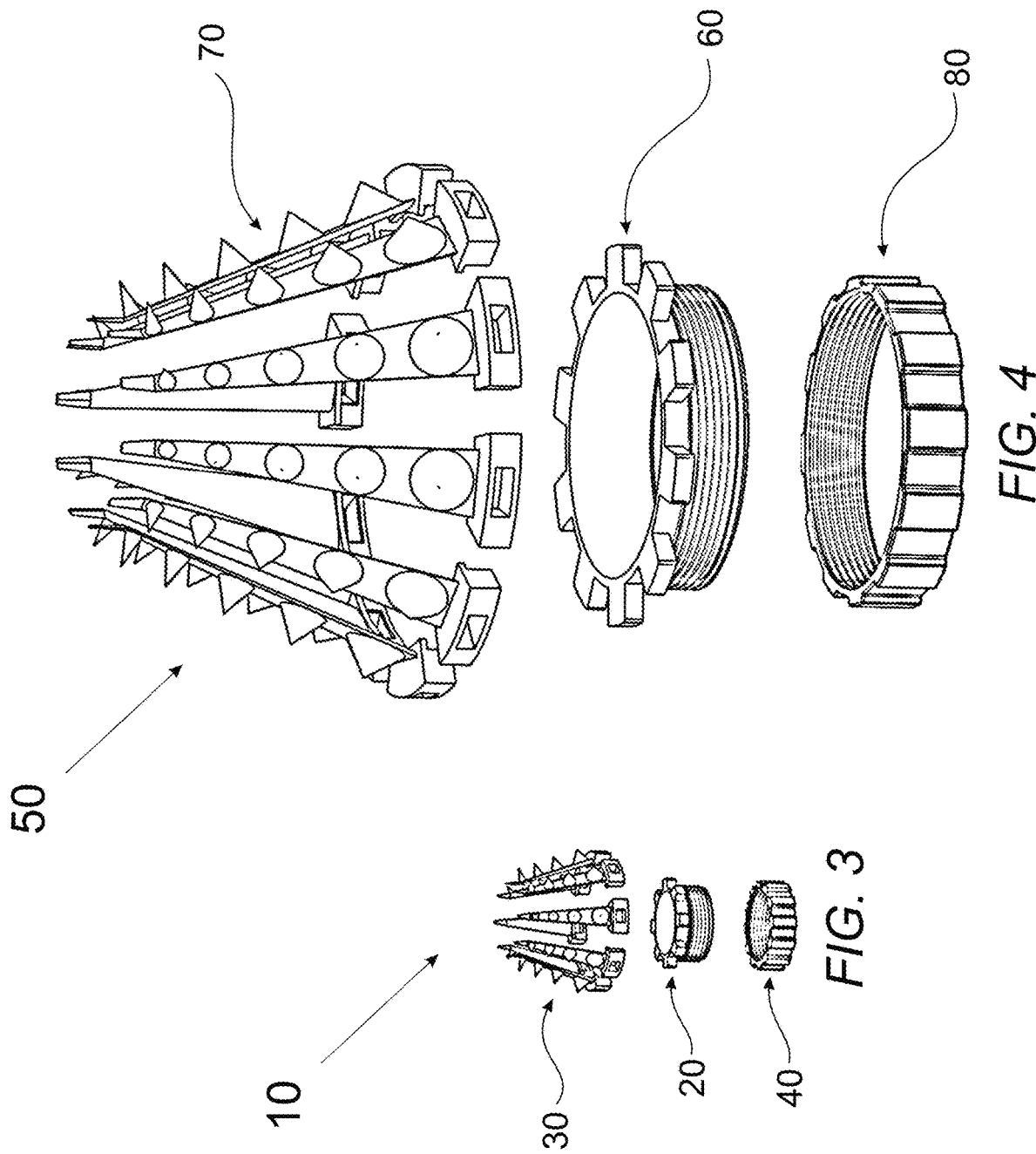

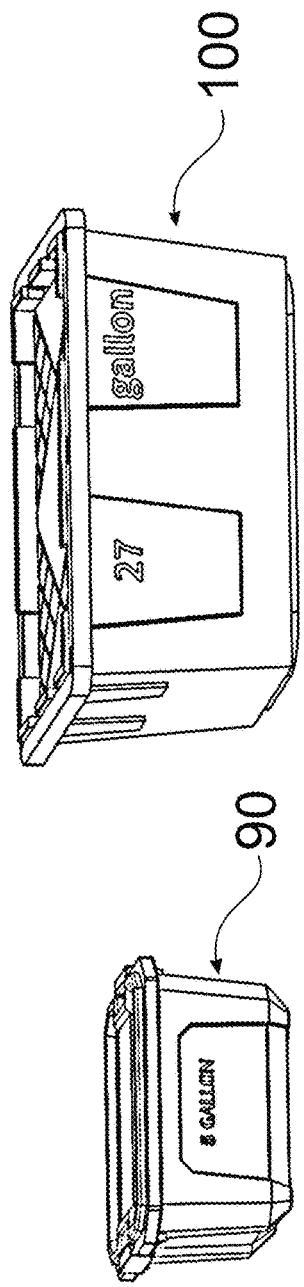
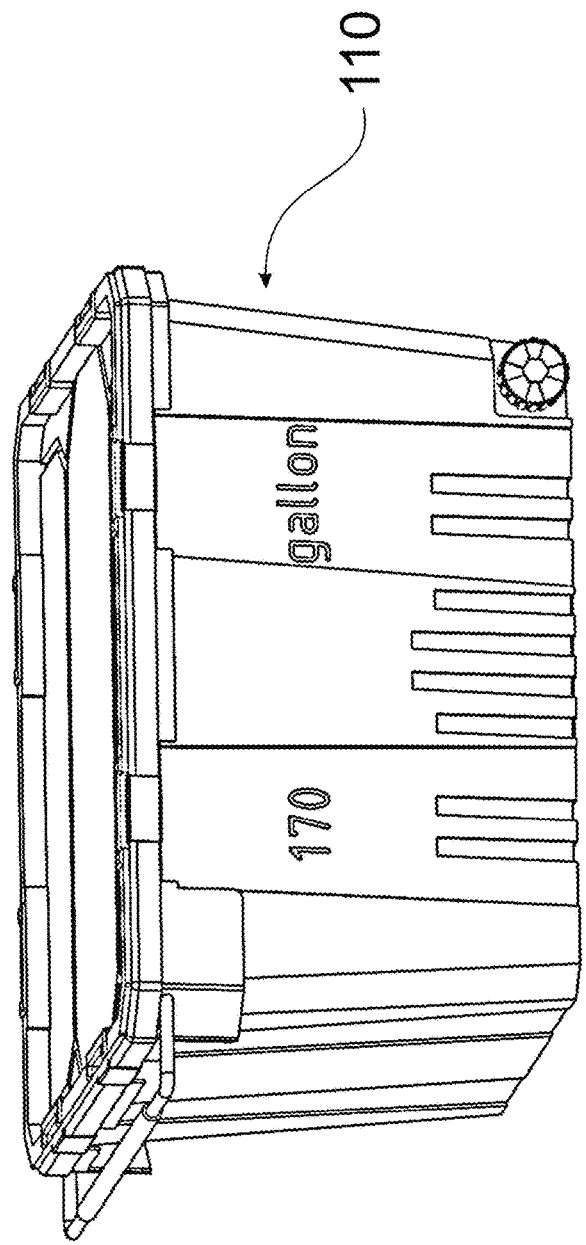
FIG. 16
FIG. 17
FIG. 18

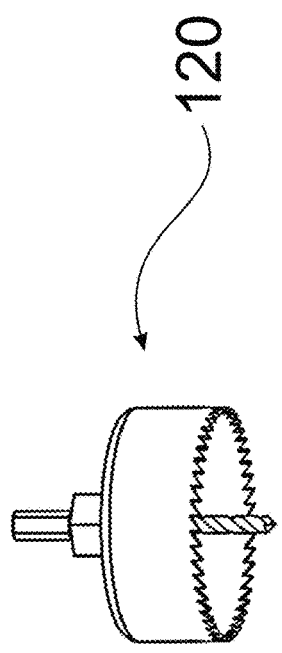
FIG. 19
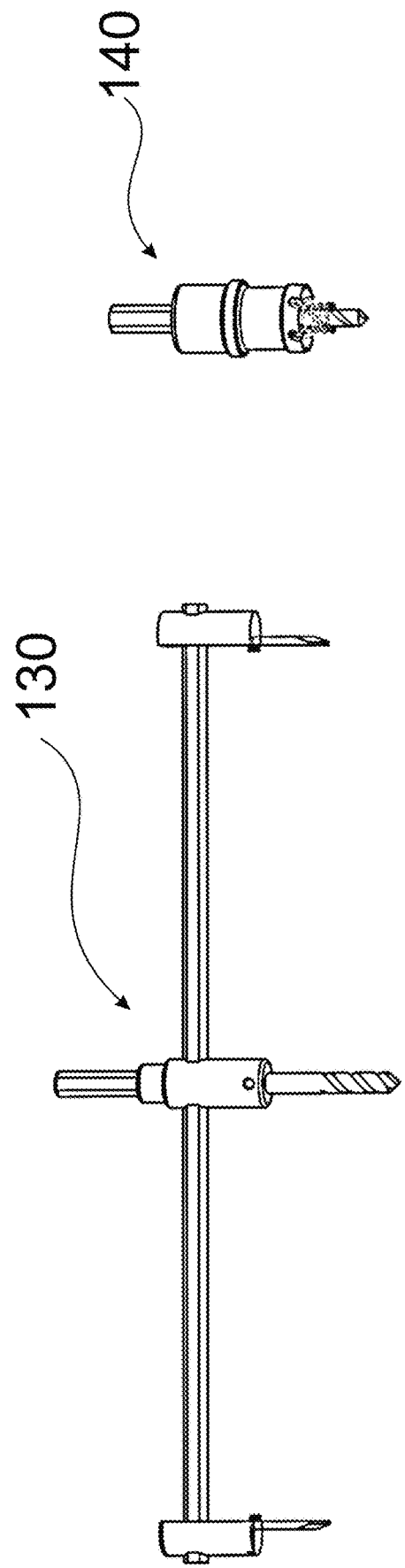
FIG. 20
FIG. 21

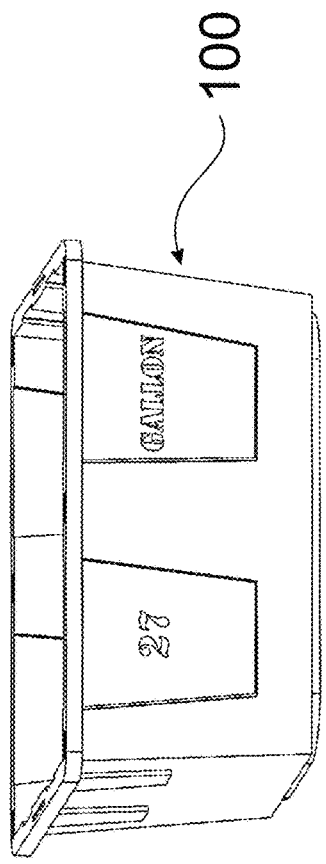
FIG. 27
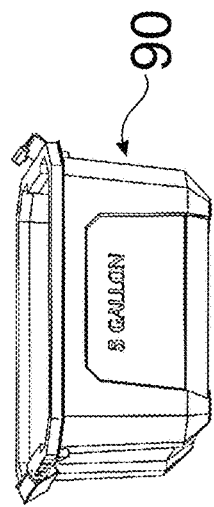
FIG. 25
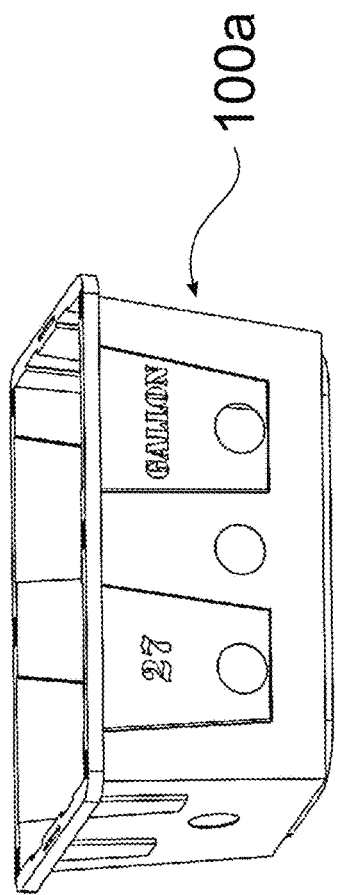
FIG. 28
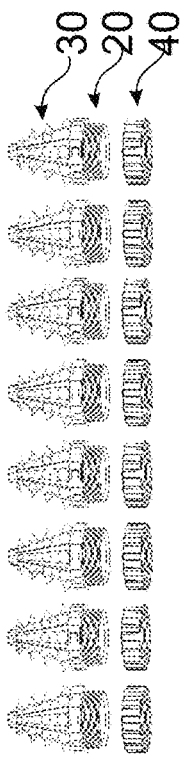
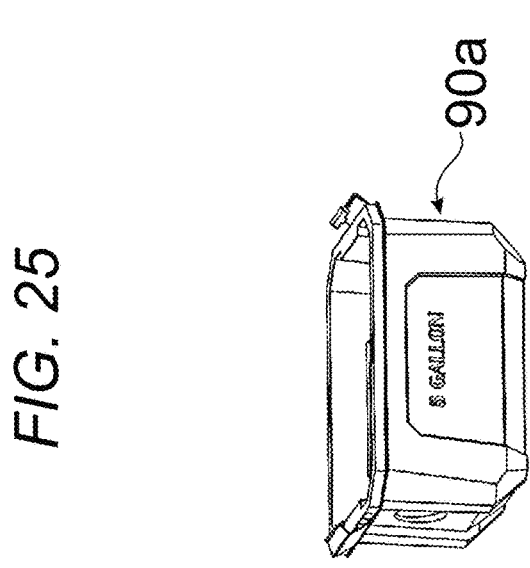
FIG. 26
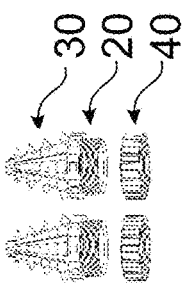

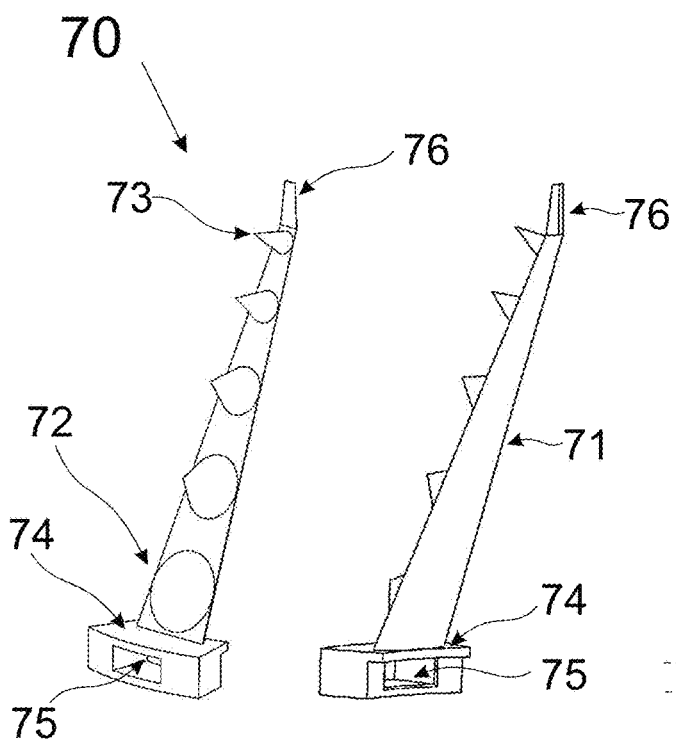
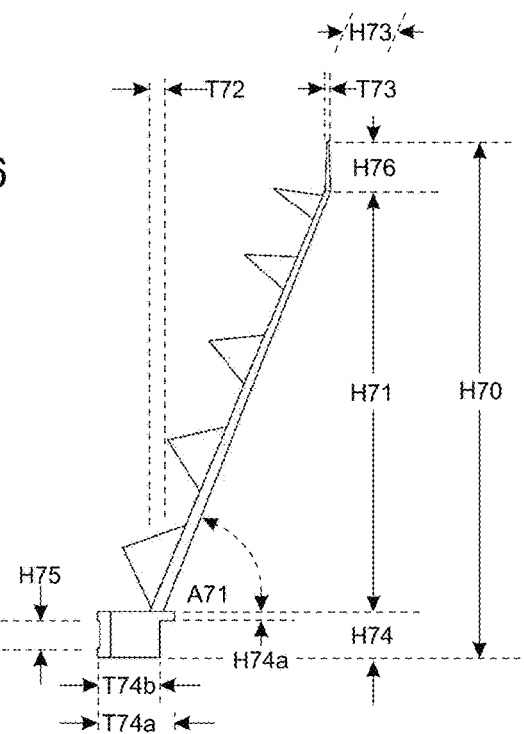
FIG. 54   FIG. 55
FIG. 56
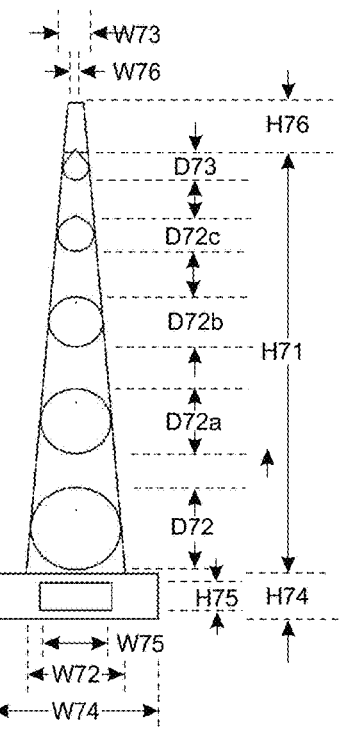
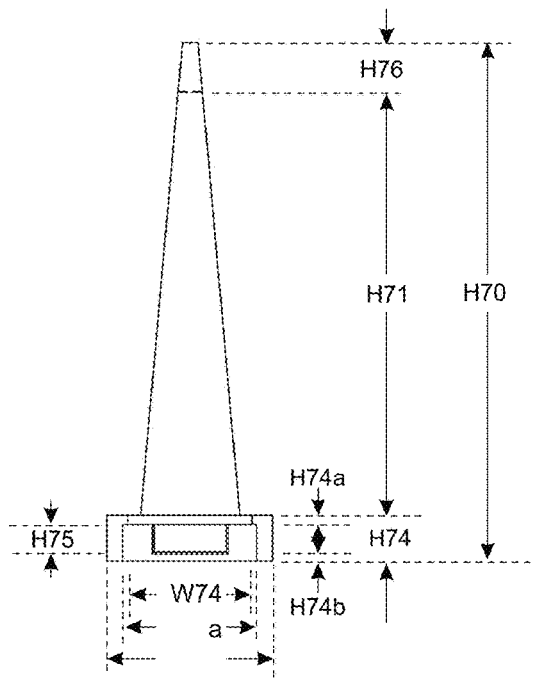
FIG. 57
FIG. 58

COMPOSABLE INSERTS FOR DIY TRAPS

BACKGROUND OF THE INVENTION

The present invention relates to pest control, and in particular to a modular, Do-It-Yourself (DIY) composable insert system for constructing live traps for pests such as rodents and invasive fish species using common, user-supplied containers.

The effective management of pests presents an ongoing challenge in residential, agricultural, and ecological contexts. Rodents, for example, can cause property damage and pose health risks in homes and businesses. Similarly, invasive fish species can disrupt local ecosystems, outcompeting native populations for resources. While various traps are commercially available, they often come with significant drawbacks.

The manufacture of conventional one-piece traps, particularly those incorporating complex internal structures like one-way funnels or inwardly-projecting spikes, requires intricate and expensive molds. This complexity in plastic injection molding leads to high manufacturing costs, which are ultimately borne by the consumer. Furthermore, these pre-manufactured traps are of a fixed size and design, offering little adaptability for different target species, varying levels of infestation, or specific environmental placements. A trap designed for a small rodent is ineffective for a large invasive fish, and vice-versa.

In contrast, a wide variety of low-cost, durable containers are readily available to the public. Plastic storage totes, for instance, are sold in numerous sizes, from small 5-gallon bins to large 170-gallon rolling totes, at hardware stores, membership clubs, and general retailers. These containers represent ideal, robust bodies for live traps. However, there is a lack of standardized, effective, and easy-to-install components that would allow an average person to convert such a container into a reliable trap.

Therefore, a need exists for a cost-effective, versatile, and easily manufactured system that empowers end-users to create customized live traps from commonly available containers, thereby overcoming the cost and rigidity limitations of conventional, pre-made traps.

SUMMARY OF THE INVENTION

The present invention addresses the above and other needs by providing a composable insert system designed to be installed into a user-provided container to create a highly effective DIY live trap. The system is modular, comprising a main flange body, a plurality of individual thorny spike elements, and a corresponding lock nut. This three-part design simplifies manufacturing to just three manageable molds per size, significantly reducing production costs and logistical complexity compared to a single, large trap body.

In accordance with one aspect of the invention, the main flange body is engineered with an external thread and a series of receiving slots. The individual thorny spike elements are designed with a unique base that securely but removably snaps into these slots, allowing a user to assemble an inwardly-projecting conical barrier piece by piece. This assembled cone creates a one-way passage: the smooth, angled outer surfaces of the spikes guide a pest easily into the trap, while the sharp, overlapping inner points make egress impossible. The entire assembly is then securely fastened to the wall of a container by the lock nut.

In accordance with another aspect of the invention, the system is fully scalable to target a wide range of pests. A smaller-scale version, intended for installation into a 3-inch diameter hole, is optimized for rodents. A larger-scale version, which can be adapted for holes ranging from 6 inches up to 36 inches, is designed for various sizes of fish. This scalability allows a user to select the appropriate insert and container size for their specific needs, from a small household mouse trap to a large-capacity floating trap for managing invasive fish in a pond or lake.

The present invention provides numerous benefits, including: 1) significantly lower manufacturing cost by breaking down a complex part into simple, composable elements; 2) unparalleled versatility for the end-user, who can choose the size, number, and placement of trap entrances; 3) simple and intuitive assembly using common household tools, such as a cordless drill and a standard hole saw; and 4) reduced storage and shipping volume due to the compact, unassembled nature of the components.

BRIEF DESCRIPTION OF DRAWINGS

The above and other aspects, features and advantages of the present invention will be more apparent from the following more particular description thereof, presented in conjunction with the following drawings wherein:

FIG. 3 is an exploded view of the composable insert for a DIY rodent trap, showing the three main components.

FIG. 4 is an exploded view of the composable insert for a DIY fish trap.

FIG. 16 is a perspective view of a 5-gallon storage tote suitable for use with the present invention.

FIG. 17 is a perspective view of a 27-gallon storage tote suitable for use with the present invention.

FIG. 18 is a perspective view of a 170-gallon rolling tote suitable for use with the present invention.

FIG. 19 is a view of a 3-inch hole saw for installing the rodent-sized insert.

FIG. 20 is a view of an adjustable circular cutter for installing the fish-sized insert.

FIG. 21 is a perspective view of a 1-inch hole saw for drilling 1-inch holes.

FIG. 25 illustrates a 5-gallon tote prepared for cutting.

FIG. 26 illustrates a 5-gallon tote after cutting, with rodent insert components ready for assembly.

FIG. 27 illustrates a 5-gallon tote prepared for cutting.

FIG. 28 illustrates a 5-gallon tote after cutting, with fish size insert components ready for assembly.

FIG. 54 is a perspective front view of a single thorny spike element for the fish trap insert.

FIG. 55 is a perspective rear view of a single thorny spike element for the fish trap insert.

FIG. 56 is a dimensioned side view of a single thorny spike element for the fish trap insert.

FIG. 57 is a dimensioned front view of a single thorny spike element for the fish trap insert.

FIG. 58 is a dimensioned rear view of a single thorny spike element for the fish trap insert.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 2:
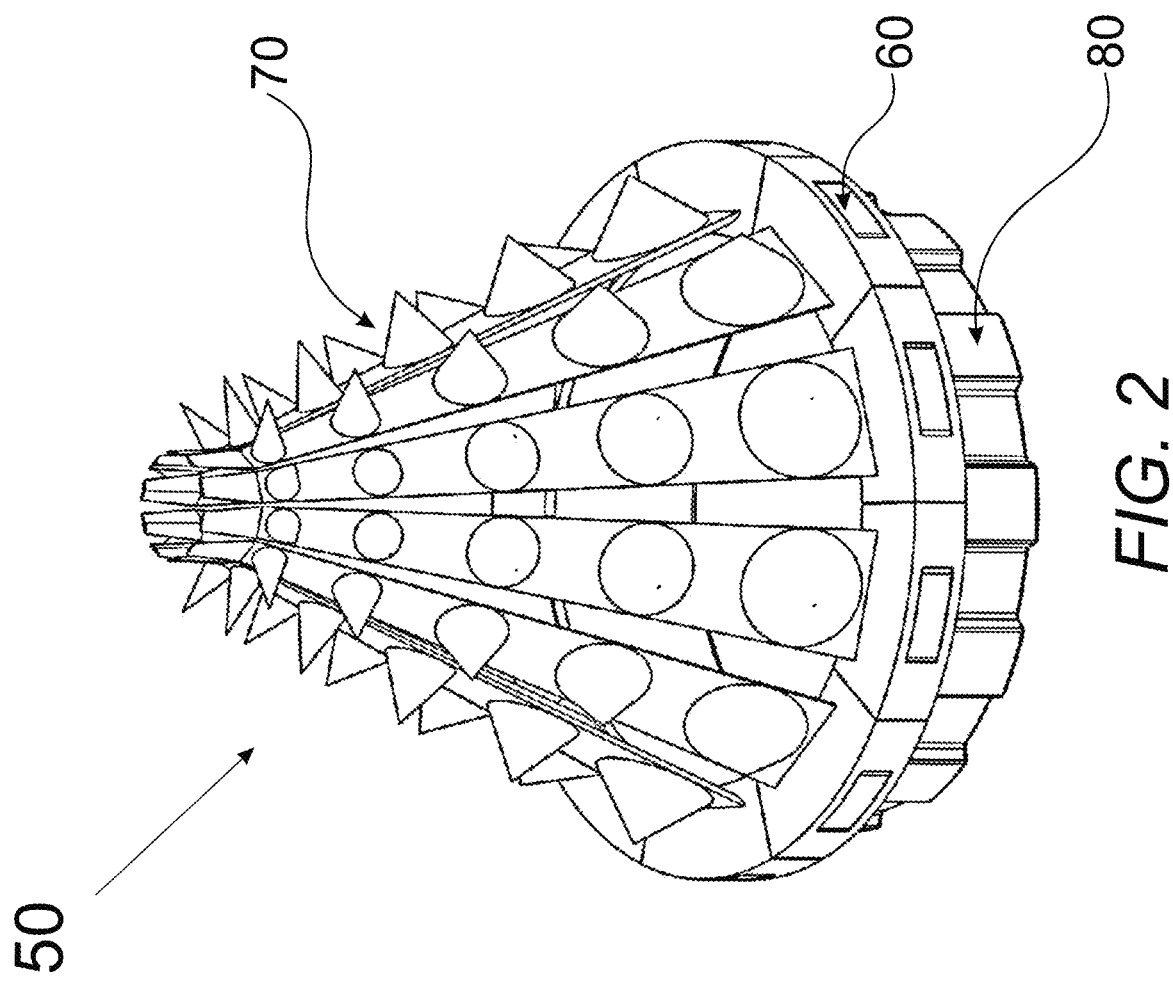
FIG. 2 is a trimetric view of the fully assembled composable insert for a DIY fish trap.
Figure 1:
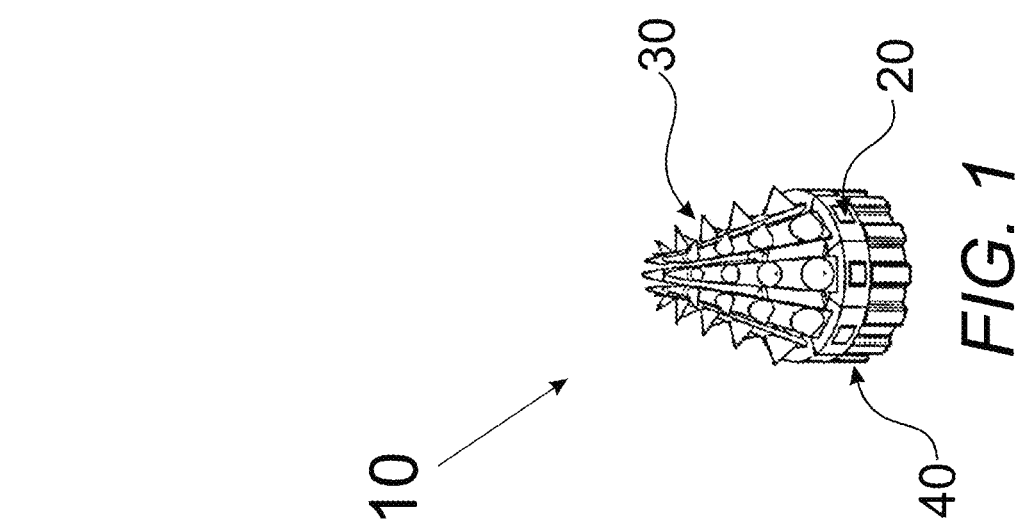
FIG. 1 is a trimetric view of the fully assembled composable insert for a DIY rodent trap.
Figure 6:
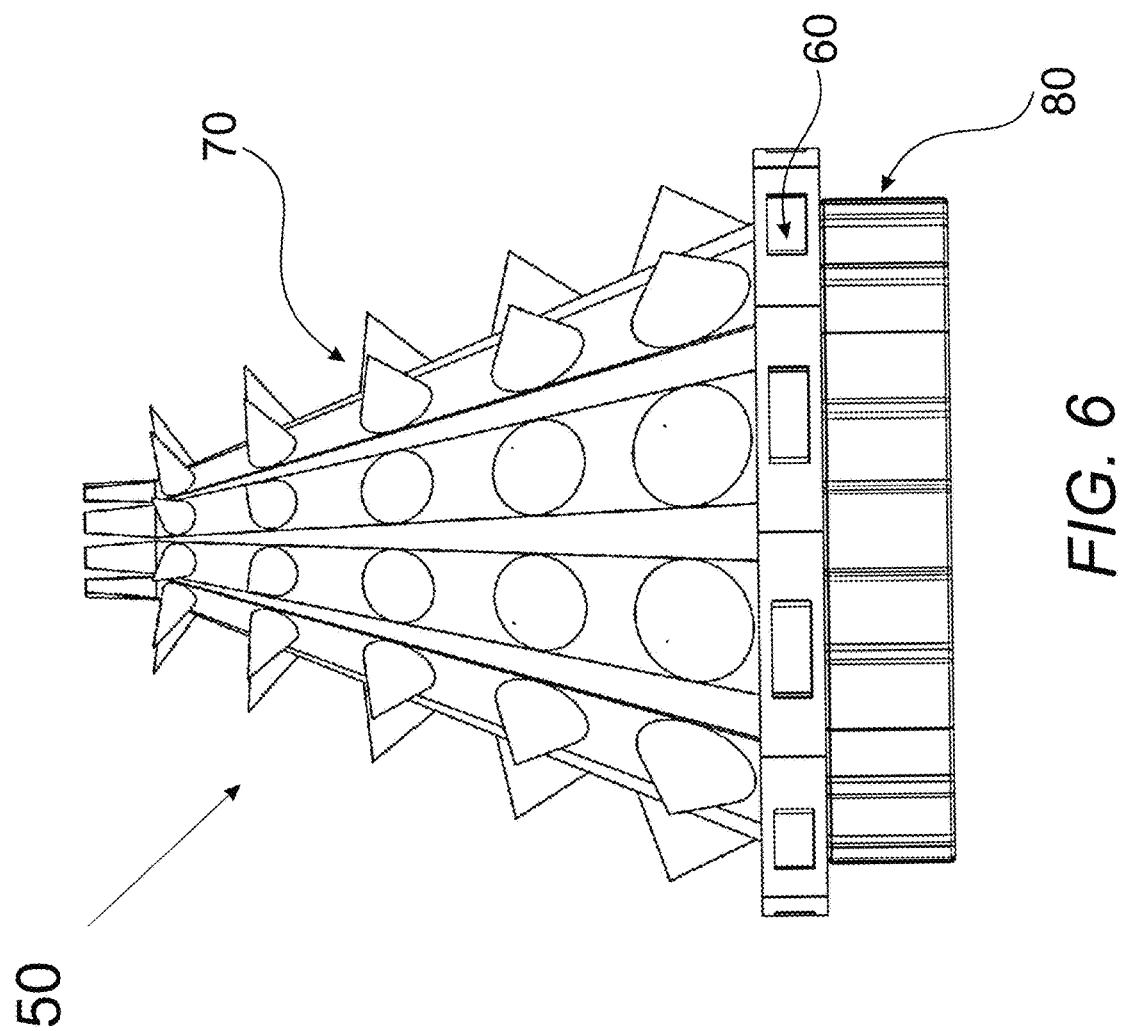
FIG. 6 is a side view of the assembled composable insert for a DIY fish trap.
Figure 5:
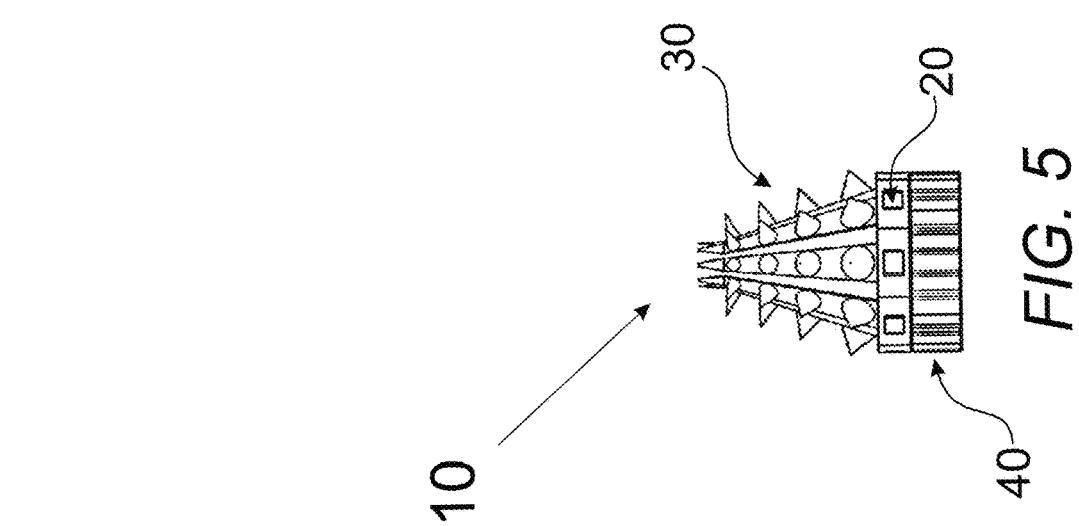
FIG. 5 is a side view of the assembled composable insert for a DIY rodent trap.
Figure 8:
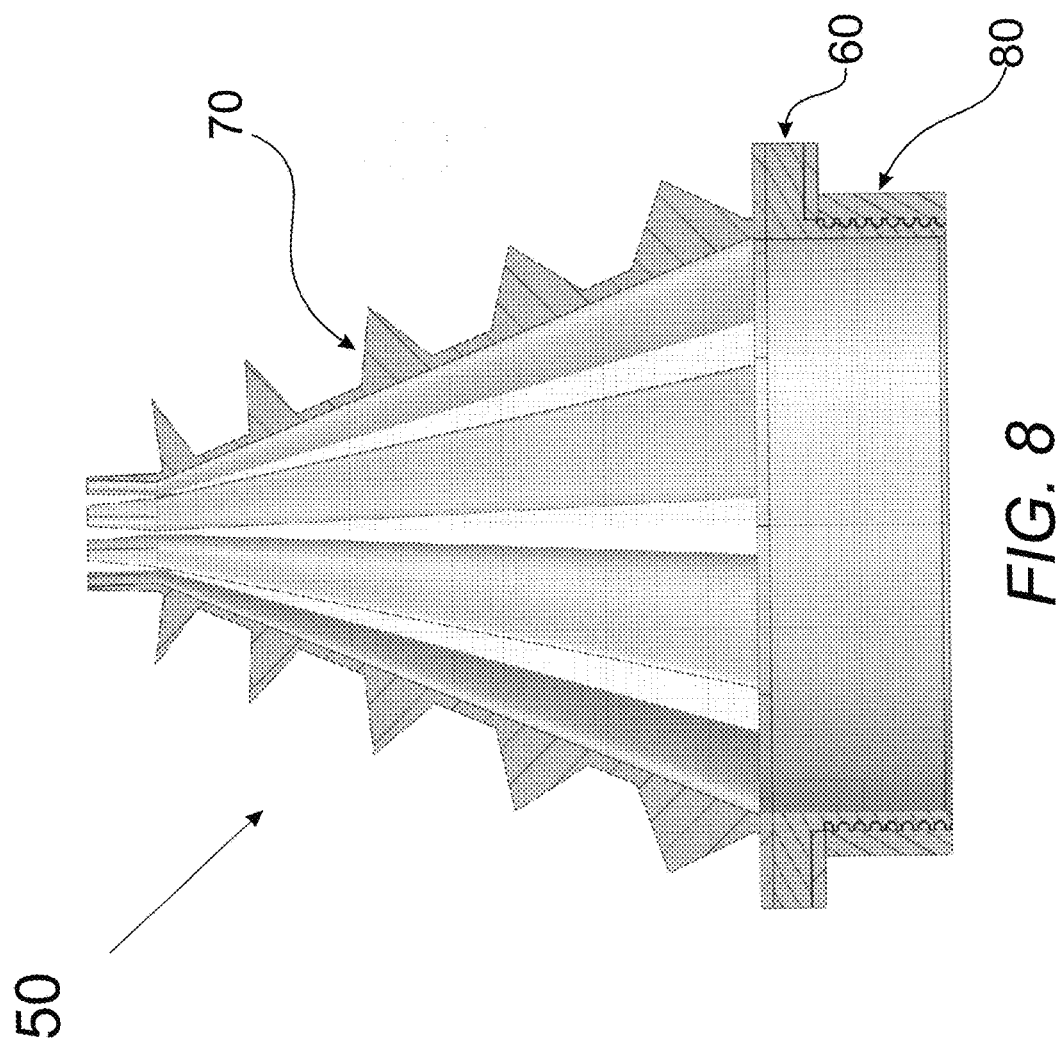
FIG. 8 is a cross-section view of the assembled composable insert for a DIY fish trap.
Figure 7:
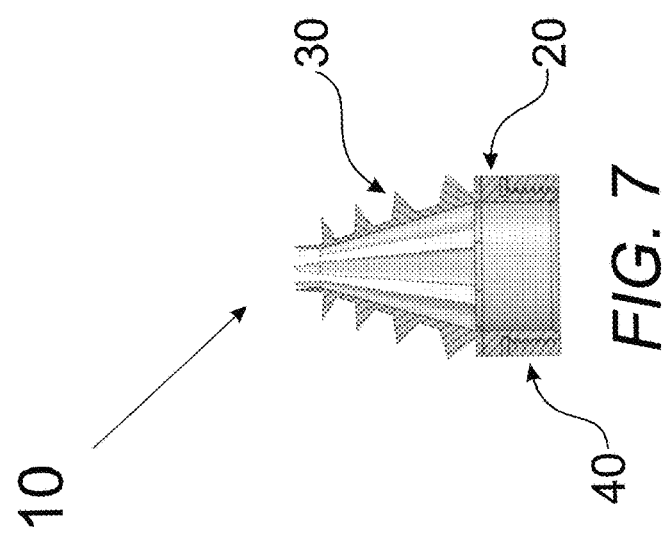
FIG. 7 is a cross-section view of the assembled composable insert for a DIY rodent trap.
Figure 10:
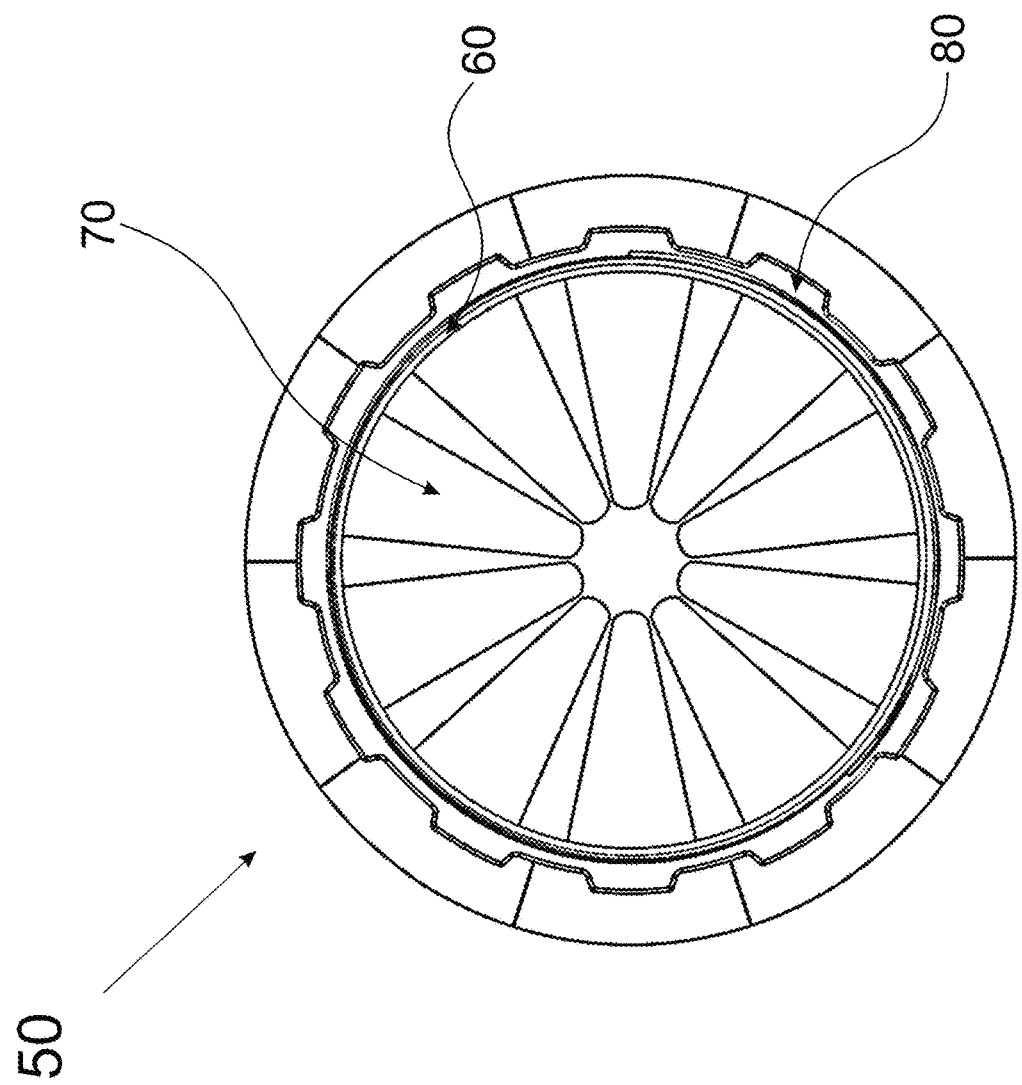
FIG. 10 is a bottom view of the assembled composable insert for a DIY fish trap.
Figure 9:
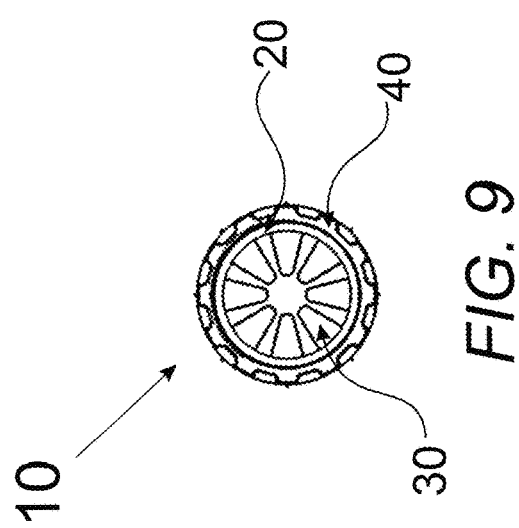
FIG. 9 is a bottom view of the assembled composable insert for a DIY rodent trap.
Figure 12:
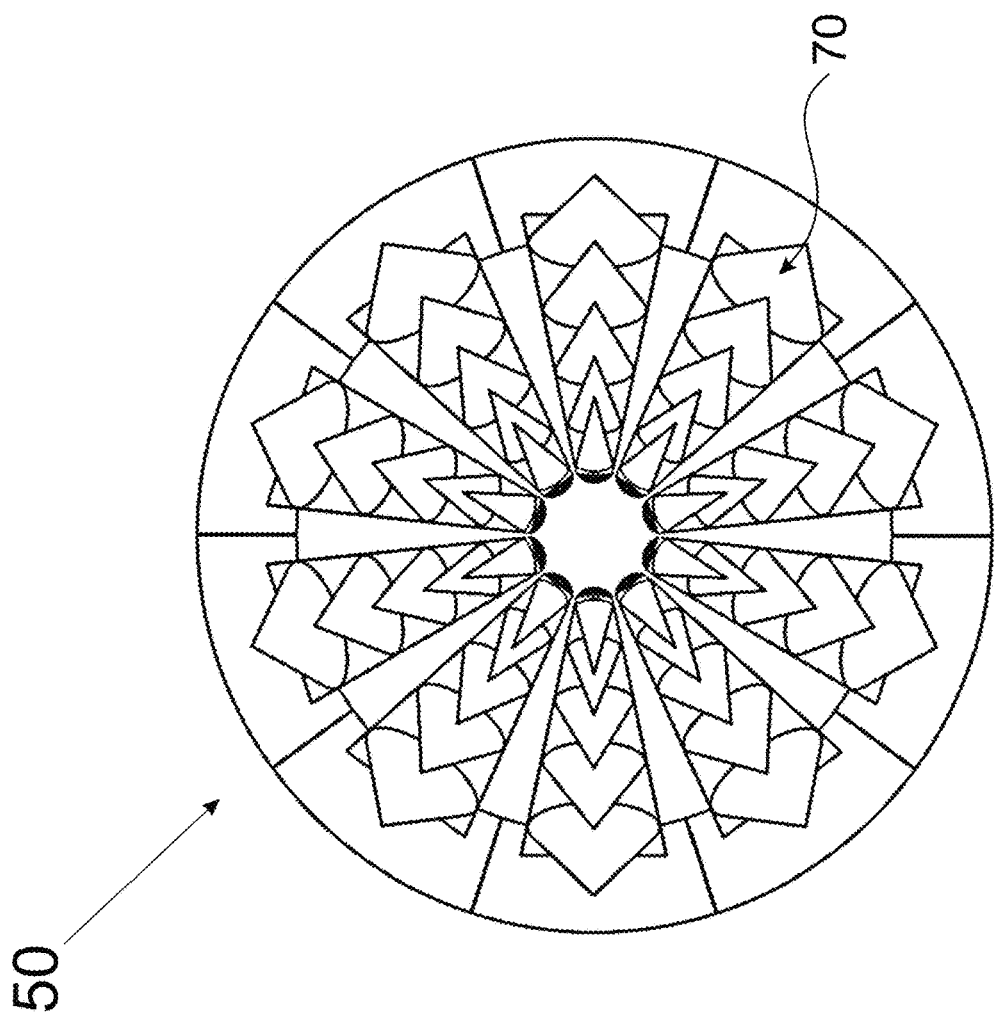
FIG. 12 is a top view of the assembled composable insert for a DIY fish trap.

Referring now to the drawings, a complete set of composable inserts for a DIY rodent trap 10 is shown in FIG. 1, and for a DIY fish trap 50 in FIG. 2. As illustrated in the exploded views in FIG. 3 and FIG. 4, each insert assembly comprises a main flange body 20 for rodents, 60 for fish; a plurality of thorny spike elements 30 for rodents, 70 for fish, which form the one-way barrier; and a lock nut 40 for rodents, 80 for fish, which provides the securing mechanism. FIGS. 5 to 12 are different views of the present invention.

Figure 11:
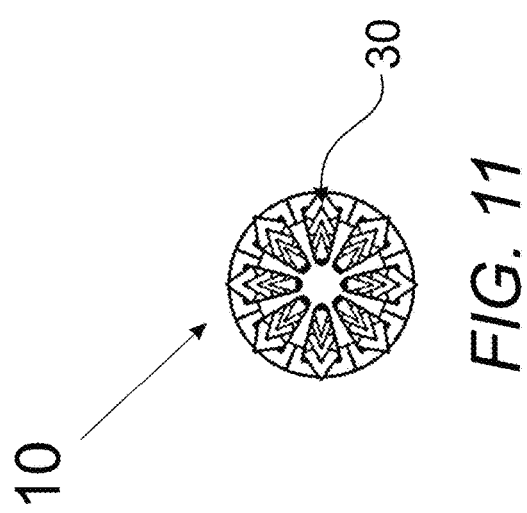
FIG. 11 is a top view of the assembled composable insert for a DIY rodent trap.
Figure 13:
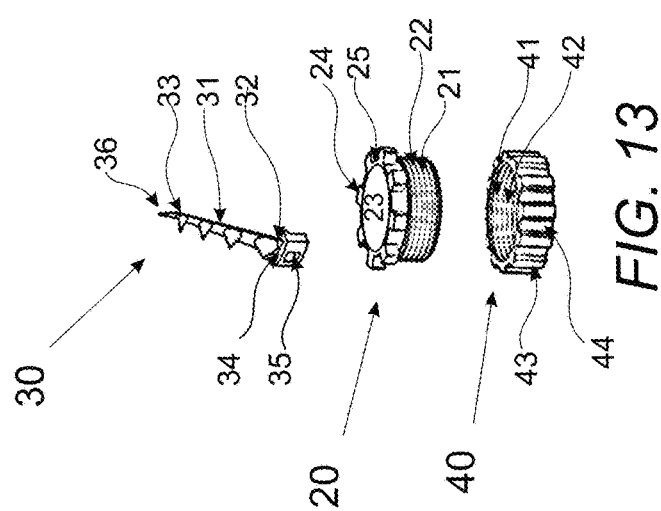
FIG. 13 is a detailed trimetric view of the individual components of the composable insert for a DIY rodent trap.

An exploded view of the rodent-sized components is provided in FIG. 13. The main flange body 20 is a cylindrical piece with an external thread defined by its major diameter 21 and minor diameter 22. At its distal end, a flange 24 extends radially outward and preferably includes integrated teeth to provide a positive grip against a container surface, preventing rotation during and after installation. The central opening of the body defines the entry diameter 23. A series of opening slots 25 distributed around the circumference of the body 20. Each single thorny spike element 30 is designed to be seated securely in one of these slots 25. Spike 30 comprises an elongated spike body 31, which is tapered to a sharp top thorn 36. The base of the spike 34 is specifically shaped for an interlocking fit into a slot 25, incorporating a snug fit slot 35 that lock into place. When all individual spikes 30 are installed, they form an inwardly-projecting conical structure, as seen in FIG. 11, that allows pests easy entry while making exit physically impossible. The lock nut 40, featuring a corresponding internal thread (major diameter 41, minor diameter 42) and a textured outer grip 43 for easy hand-tightening, clamps the flange body 20 to the wall of a container.

The specific dimensions of the rodent insert components, detailed in FIG. 37 through FIG. 49, are optimized for effectiveness. For the main flange body 20, shown in FIGS. 37, 38, 39, and 40, the major exterior diameter D21 is preferably between 2.5 inches and 5 inches, and more preferably about 3 inches. This dimension is specifically chosen to correspond with a widely available and standard 3-inch hole saw bit, simplifying installation for the user. A minor exterior diameter D22 is preferably between 2.36 inches and 4.73 inches, and more preferably about 2.835 inches. The entry diameter D23 is preferably between 2 inches and 4.5 inches, and more preferably about 2.5 inches, providing an inviting opening for common rodents. The flange diameter D24 is preferably between 3 inches and 6 inches, and more preferably about 3.5 inches. The opening slots diameter D25 is preferably between 2.5 inches and 4.5 inches, and more preferably about 2.75 inches. The flange tooth width W24 is about 0.5 inches, while the opening slot width W25a is about 0.573 inches, and the gap between slots width W25b is about 0.877 inches. The overall height H20 of the body is preferably between 1.25 inches and 2 inches, and more preferably about 1.5 inches. This includes a threaded section height H21, which is preferably between 0.875 inches and 1.375 inches, and more preferably about 1 inch, a flange tooth height H24, which is preferably between 0.25 inches and 0.5 inches, and more preferably about 0.375 inches, and a flange height H25 which is preferably between 0.375 inches and 0.625 inches, and more preferably about 0.5 inches.

For the thorny spike 30, detailed in FIGS. 41, 42, 43, 44, and 45, the overall height H30 is about 4.29 inches, which includes a spike body height H31 of about 3.162 inches and a top thorn height H36 of about 0.5 inches. The base height H34 is about 0.632 inches, composed of a base upper section height H34a of about 0.125 inches and a base lower section height H34b of about 0.125 inches. The snug fit slot height H35 is about 0.378 inches. The spike has a lower width W32 of about 0.75 inches, tapering to an upper width W33 of about 0.25 inches. The base width W34 is about 1.334 inches, composed of an upper width W34a of about 0.953 inches and a lower width W34b of about 1.048 inches. The snug fit slot width W35 is about 0.508 inches, and the top thorn width W36 is about 0.065 inches. Diameters along the spike are about 0.68 inches at the base (D32), 0.51 inches in the middle (D32a), 0.38 inches in the upper section (D32b), and 0.26 inches at the tip (D33). The angle of inclination A31 is about 77 degrees. The spike has a thickness at its base T32 of about 0.203 inches and a thickness at its tip T33 of about 0.076 inches. The base has a side thickness T34a of about 0.5 inches and a center thickness T34b of about 0.375 inches.

For the lock nut 40, shown in FIGS. 46, 47, 48, and 49, the major internal diameter D41 is about 3.02 inches to ensure a secure, slip-free mating with the external thread of the flange body. The minor internal diameter D42 is about 2.85 inches. The outer grip diameter D43 is about 3.5 inches, and the inner grip diameter D44 is about 3.185 inches. The overall height H40 of the lock nut is about 1 inch.

Figure 14:
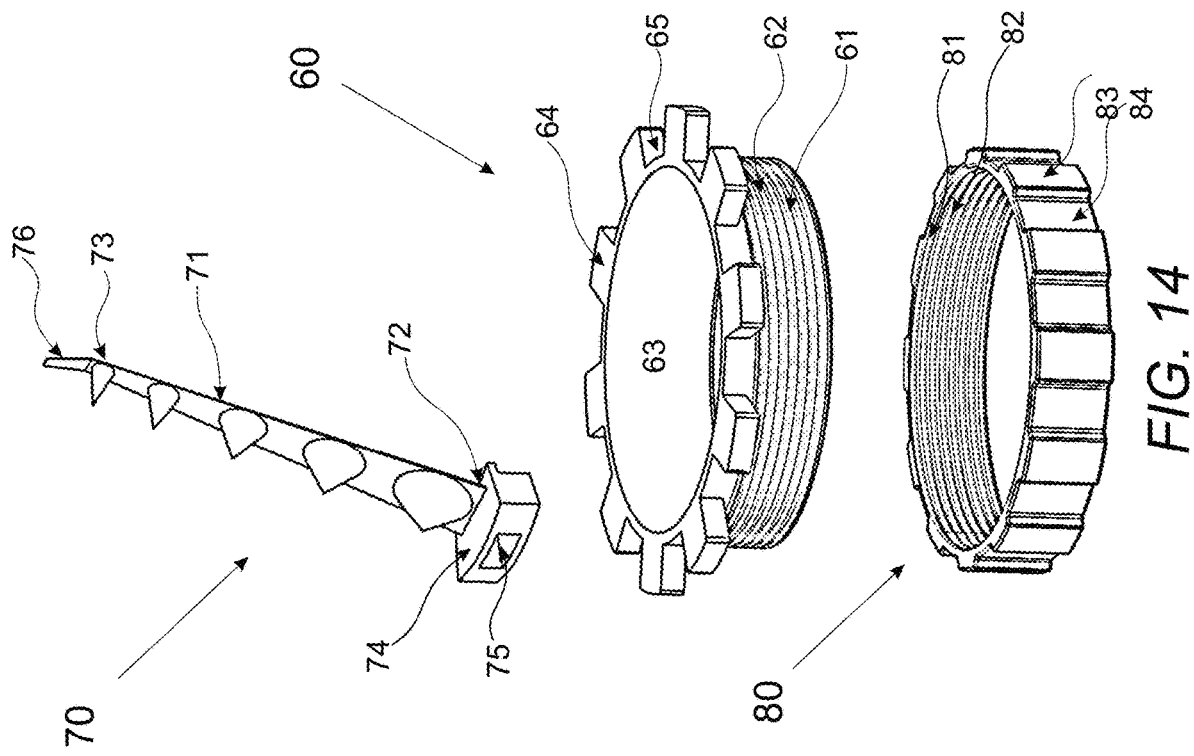
FIG. 14 is a detailed trimetric view of the individual components of the composable insert for a DIY fish trap.

FIG. 14 provides a detailed view of the larger, fish-sized components, which are strategically scaled up and modified for an aquatic environment. As detailed in FIG. 50 through FIG. 62, the fish-sized flange body 60 has a major exterior diameter D61 preferably between 6 inches and 36 inches, and more preferably about 12 inches. The minor exterior diameter D62 is preferably between 5.75 inches and 35.25 inches, and more preferably about 11.654 inches. The entry diameter D63 is preferably between 5.5 inches and 34 inches, and more preferably about 11.25 inches. The flange diameter D64 is preferably between 7.5 inches and 45 inches, and more preferably about 15 inches, while the opening slots diameter D65 is preferably between 5.75 inches and 36 inches, and more preferably about 12 inches. The flange tooth width W64 is about 2 inches, the opening slot width W65a is about 1.754 inches, and the gap between slots width W65b is about 2.704 inches. The overall height H60 is preferably between 3 inches and 10 inches, and more preferably about 3.5 inches. This includes a threaded section height H61 preferably between 2.25 inches and 8 inches, and more preferably about 2.5 inches, a flange tooth height H64 preferably between 0.5 inches and 2.25 inches, and more preferably about 0.75 inches, and a flange height H65 preferably between 0.75 inches and 2 inches, and more preferably about 1.0 inch.

For the corresponding fish-sized thorny spike 70, detailed in FIGS. 54, 55, 56, 57, and 58, the overall height H70 is about 14.38 inches. This includes a spike body height H71 of about 11.75 inches, an upper part height H73 of about 1.375 inches, and a top thorn height H76 of about 1.375 inches. The base height H74 is about 1.25 inches, with an upper section height H74a of about 0.25 inches and a lower section height H74b of about 0.25 inches. The snug fit slot height H75 is about 0.77 inches. The top thorn height H76 is about 1.375 inches. The spike has a lower width W72 of about 2.75 inches, tapering to an upper width W73 of about 0.67 inches. The base width W74 is about 4.696 inches, with an upper width W74a of about 3.734 inches and a lower width W74b of about 3.463 inches. The snug fit slot width W75 is about 2.1 inches. Diameters along the spike are about 2.5 inches at the base (D72), 1.95 inches (D72a), 1.5 inches (D72b), 1 inch (D72c), and 0.7 inches at the tip (D73). The angle of inclination A71 is about 68 degrees. The spike has a thickness at its base T72 of about 0.37 inches and a thickness at its tip T73 of about 0.157 inches, while the base has a side thickness T74a of about 1.875 inches and a center thickness T74b of about 1.436 inches.

For the fish-sized lock nut 80, shown in FIGS. 59, 60, 61, and 62, the major internal diameter D81 is about 12.03 inches, and the minor internal diameter D82 is about 11.693 inches. The outer grip diameter D83 is about 13 inches, and the inner grip diameter D84 is about 12.36 inches. The overall height H80 of the lock nut is about 2.5 inches.

The method of assembly of a composable inserts for DIY traps comprising the steps of: first, the user selects a container appropriate for the target pest, such as a compact 5-gallon tote 90 (FIG. 16) for mice or a large-volume 170-gallon tote 110 (FIG. 18) for invasive carp. Using a common cordless drill 150 and an appropriate cutting tool—such as a 3-inch hole saw 120 (FIG. 19) for the rodent insert or an adjustable circular cutter 130 (FIG. 20) for the fish insert—the user creates a clean aperture in the container wall (FIG. 25). The main flange body (20 or 60) is then inserted through this aperture from the outside. From inside the container, the user snaps the base 34 of each thorny spike 30 into an opening slot 25 on the flange body, repeating the process until all spikes are in place and the conical barrier is fully formed. Finally, the user threads the lock nut (40 or 80) onto the flange body from the outside and hand-tightens it to securely affix the entire insert assembly to the container wall.

Figure 29:
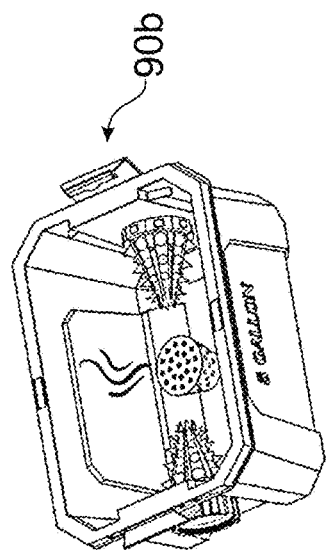
FIG. 29 shows a 5-gallon tote with two assembled inserts and bait inside.
Figure 30:
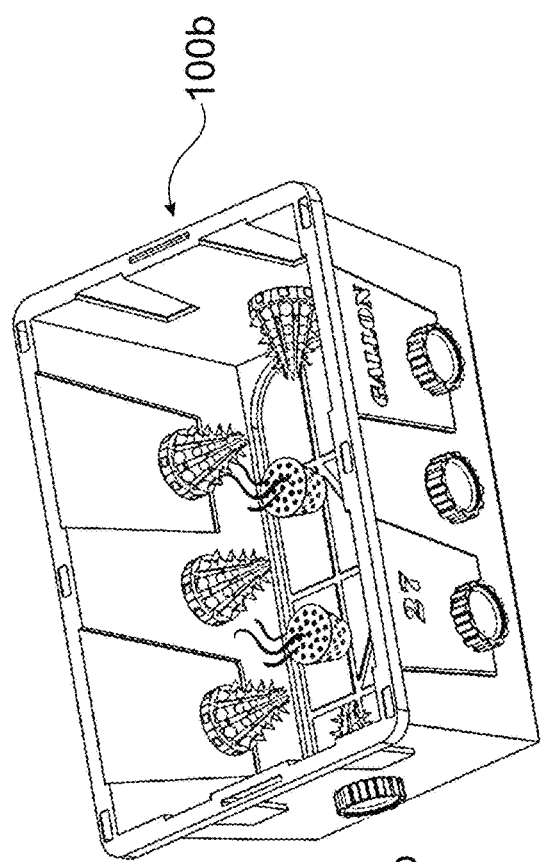
FIG. 30 illustrates a 27-gallon storage tote with eight rodent-sized inserts and baits according to the present invention.
Figure 31:
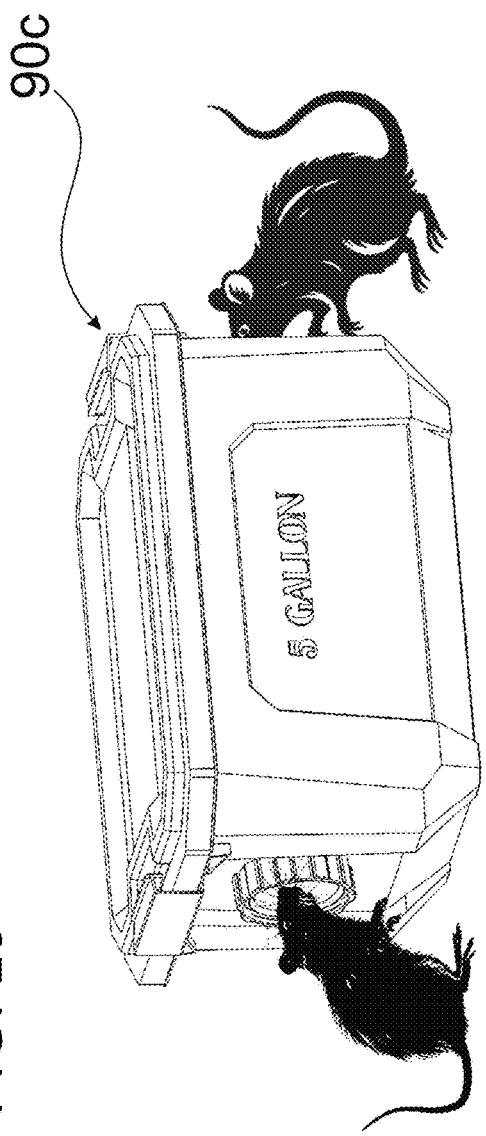
FIG. 31 illustrates a 5-gallon storage tote with closed top cover and ready to be placed in the infestation area to catch rodents.
Figure 32:
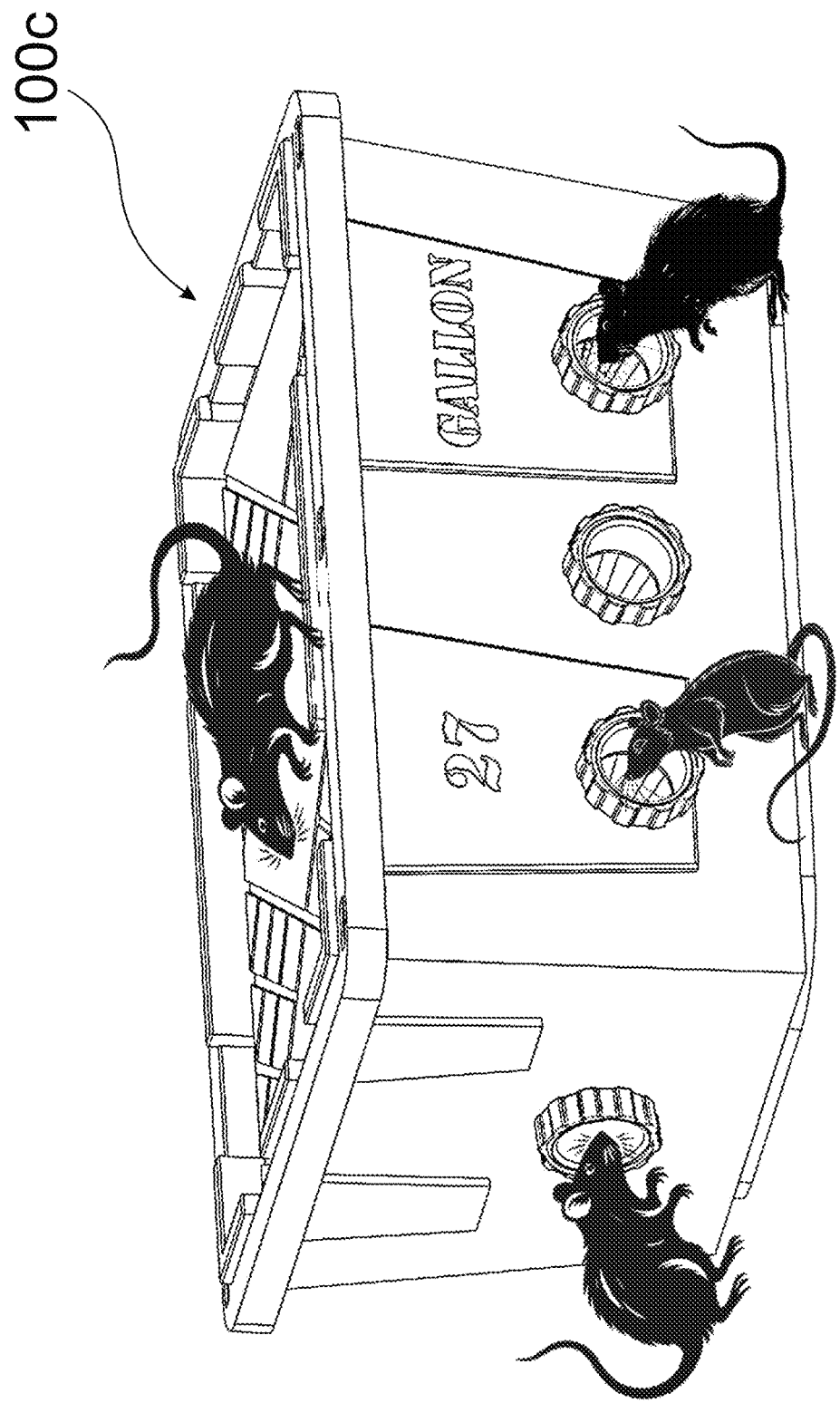
FIG. 32 is a perspective view illustrating a 27-gallon tote configured as a large-capacity rodent trap with eight assembled inserts.
Figure 33:
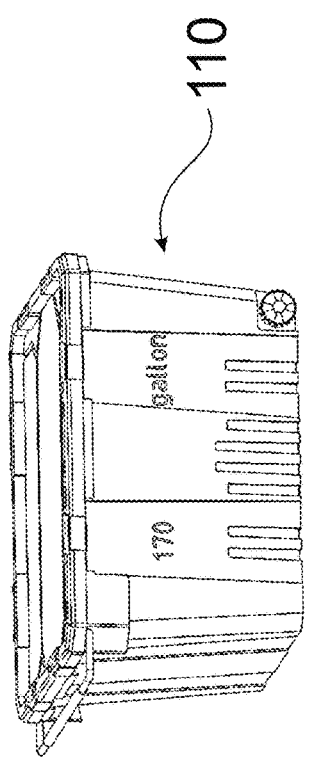
FIG. 33 is a perspective view of is a perspective view of a 170-gallon rolling tote.
Figure 34:
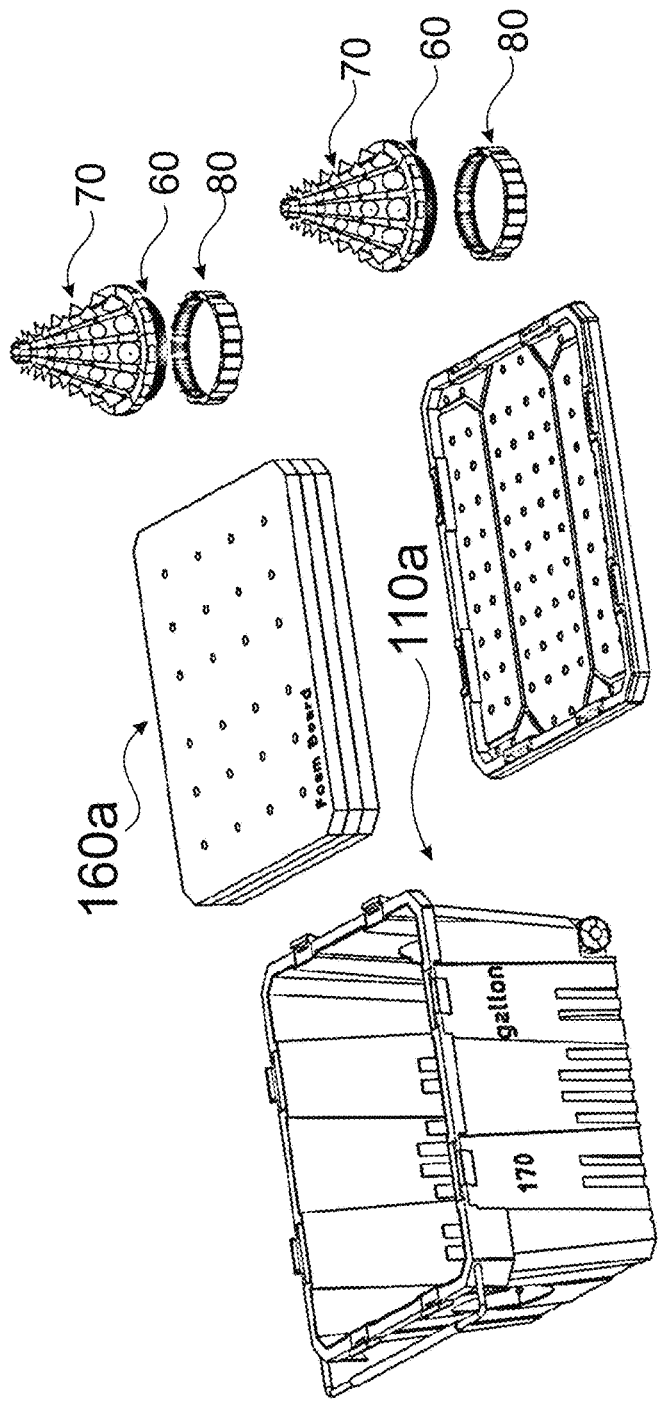
FIG. 34 illustrates a 170-gallon tote after cutting, with fish insert components and foam boards ready for assembly.
Figure 35:
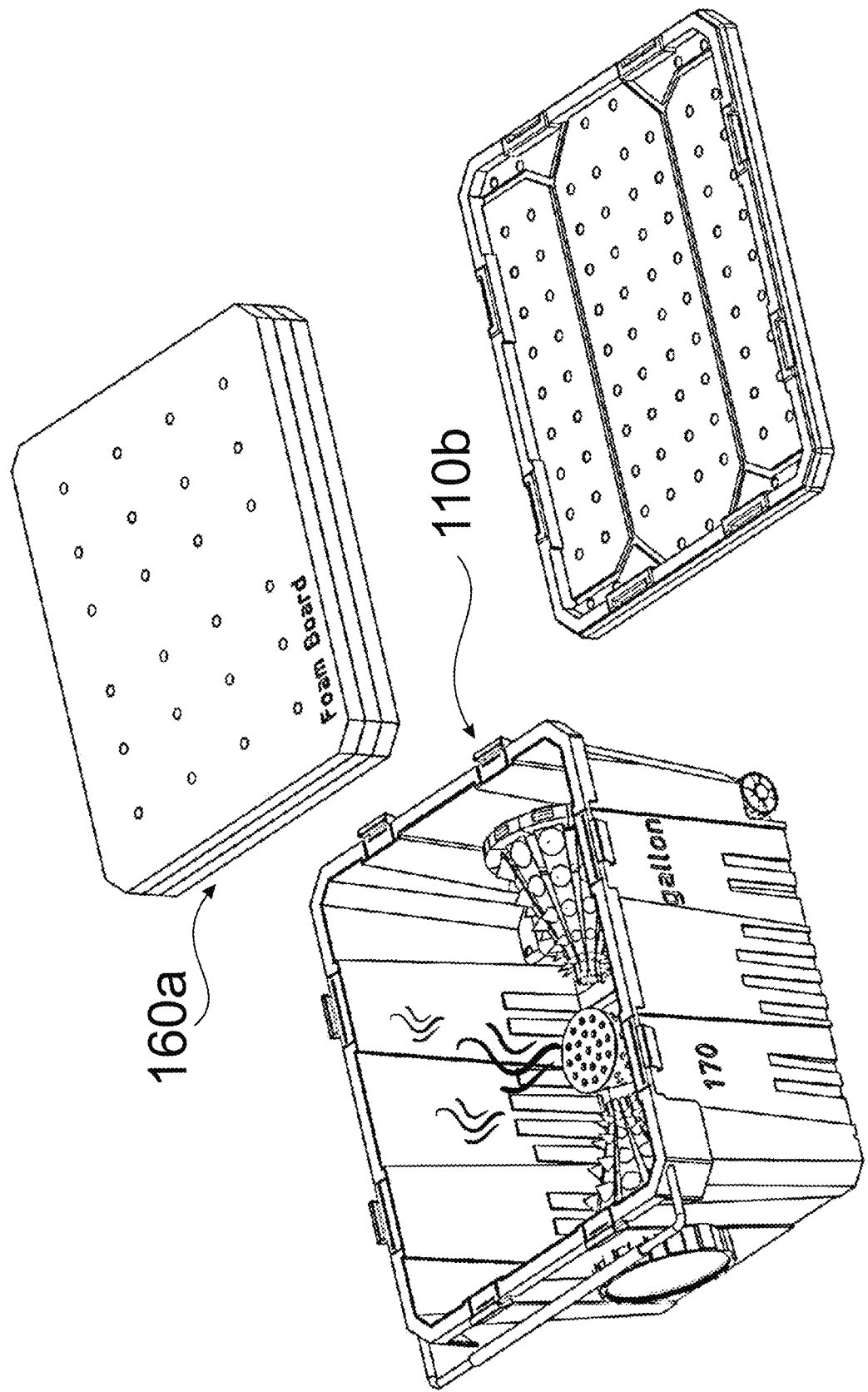
FIG. 35 illustrates a 170-gallon rolling tote composed with a couple of inserts and baits inside according to the present invention.
Figure 36:
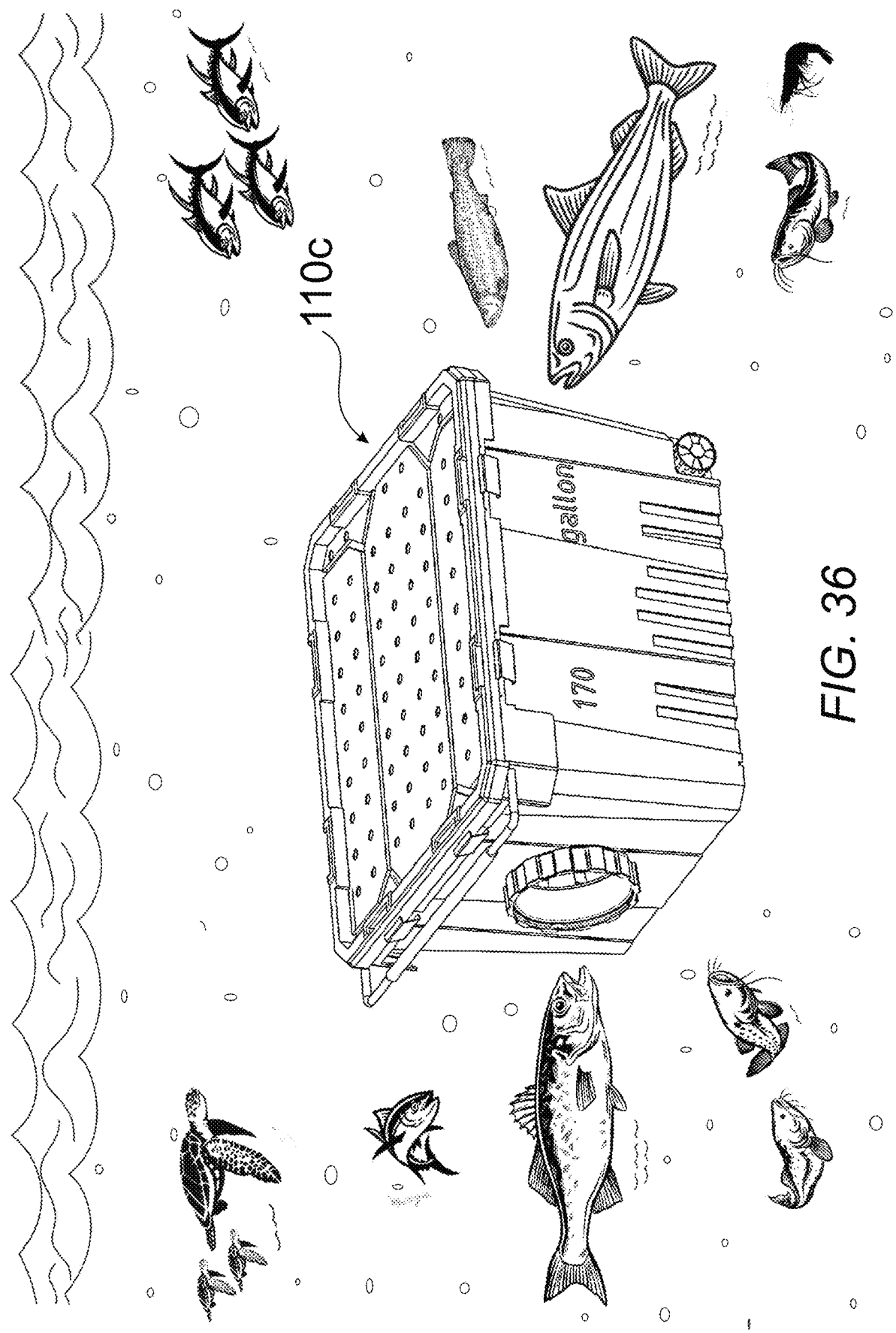
FIG. 36 illustrates a fully assembled 170-gallon fish trap deployed and floating on the water's surface.
Figure 38:
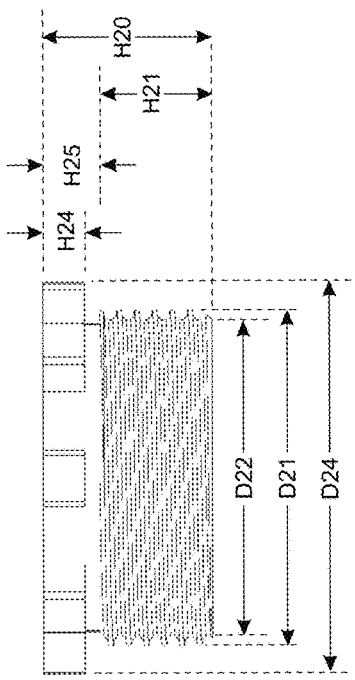
FIG. 38 is a dimensioned side view of the main flange body for the rodent trap insert.
Figure 40:
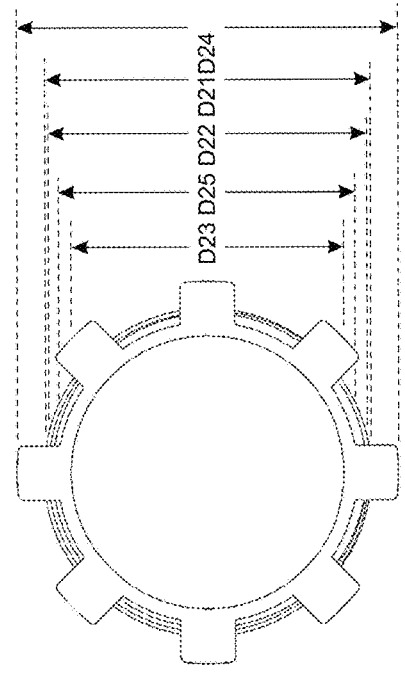
FIG. 40 is a dimensioned top view of the main flange body for the rodent trap insert.
Figure 37:
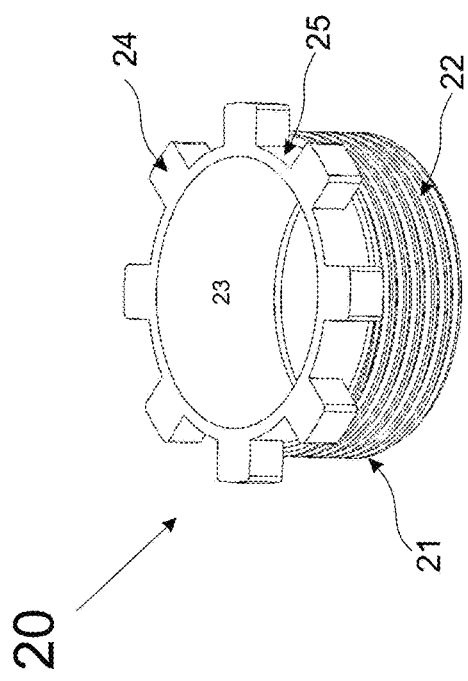
FIG. 37 is a perspective view of the main flange body for the rodent trap insert.
Figure 39:
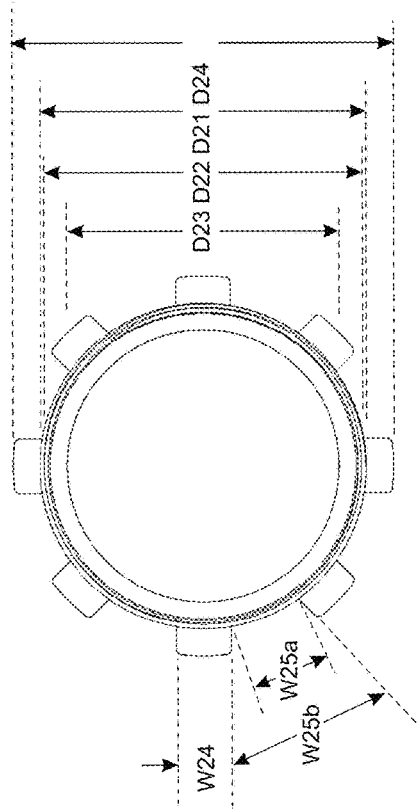
FIG. 39 is a dimensioned bottom view of the main flange body for the rodent trap insert.
Figure 41:
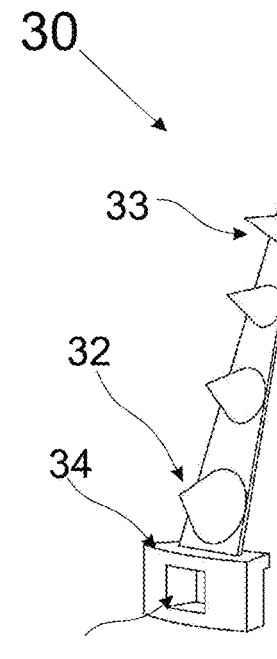
FIG. 41 is a perspective front view of a single thorny spike element for the rodent trap insert.
Figure 42:
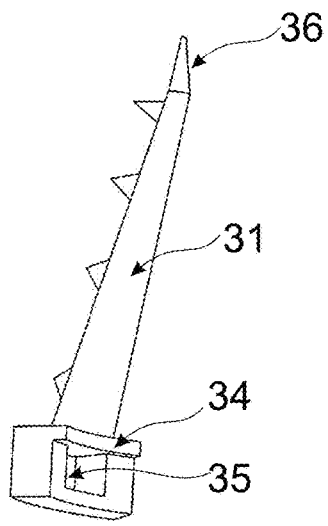
FIG. 42 is a perspective rear view of a single thorny spike element for the rodent trap insert.
Figure 43:
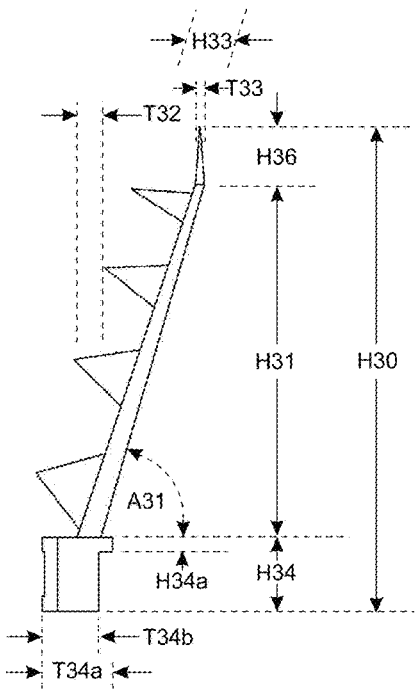
FIG. 43 is a dimensioned side view of a single thorny spike element for the rodent trap insert.
Figure 44:
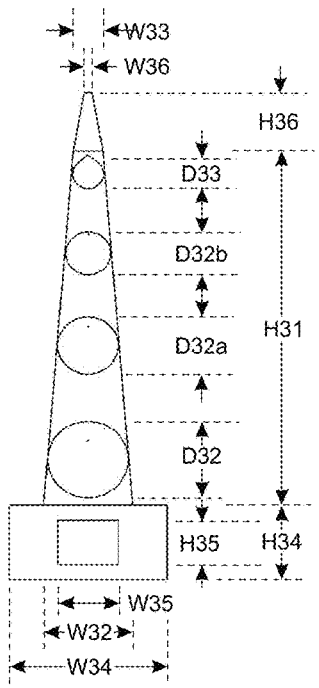
FIG. 44 is a dimensioned front view of a single thorny spike element for the rodent trap insert.
Figure 45:
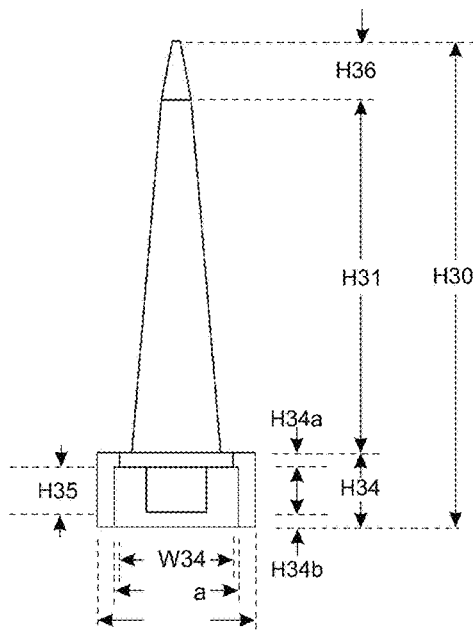
FIG. 45 is a dimensioned rear view of a single thorny spike element for the rodent trap insert.
Figure 47:
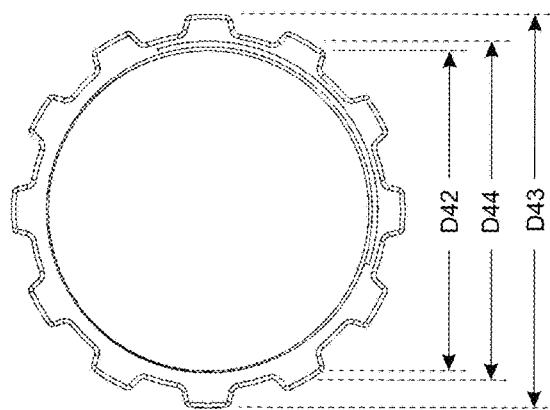
FIG. 47 is a dimensioned top view of the lock nut for the rodent trap insert.
Figure 49:
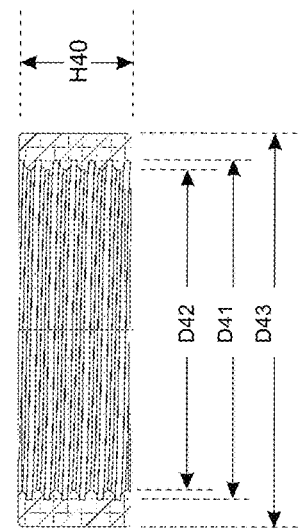
FIG. 49 is a dimensioned cross-sectional view of the lock nut for the rodent trap insert.
Figure 46:
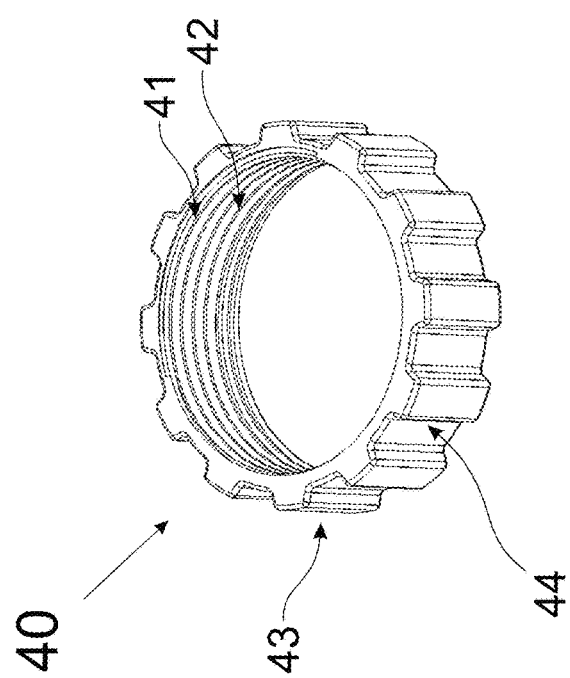
FIG. 46 is a perspective view of the lock nut for the rodent trap insert.
Figure 48:
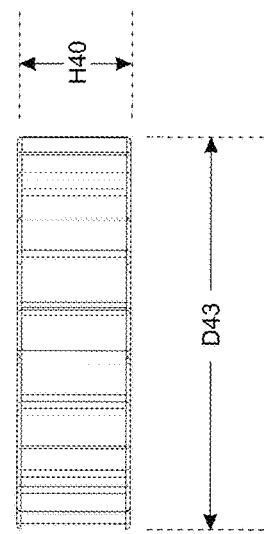
FIG. 48 is a dimensioned side view of the lock nut for the rodent trap insert.
Figure 51:
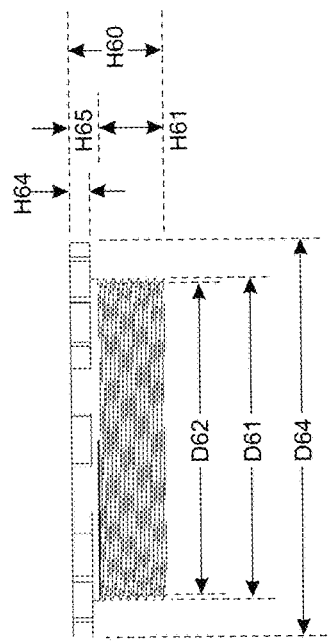
FIG. 51 is a dimensioned cross-sectional view of the main flange body for the fish trap insert.
Figure 53:
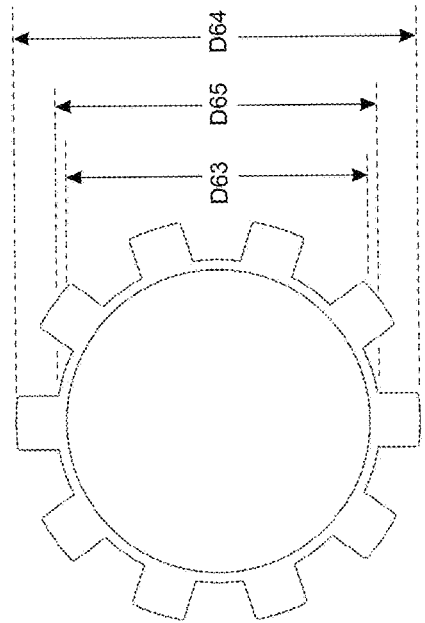
FIG. 53 is a dimensioned top view of the main flange body for the fish trap insert.
Figure 50:
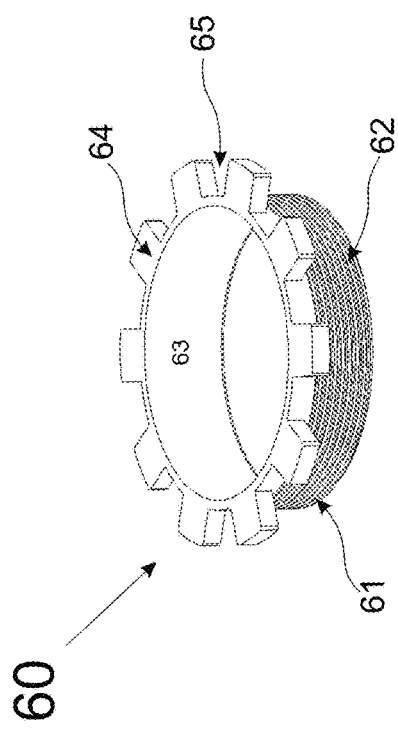
FIG. 50 is a perspective view of the main flange body for the fish trap insert.
Figure 52:
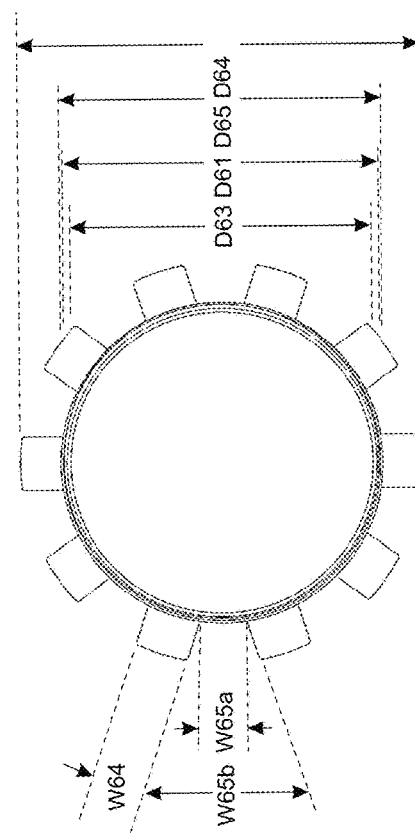
FIG. 52 is a dimensioned bottom view of the main flange body for the fish trap insert.
Figure 60:
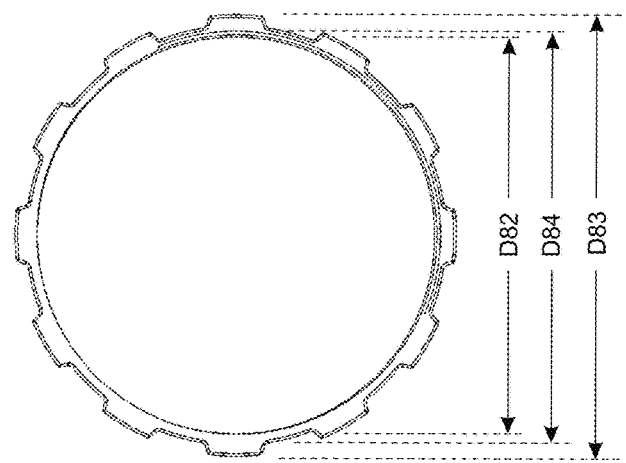
FIG. 60 is a dimensioned top view of the lock nut for the fish trap insert.
Figure 62:
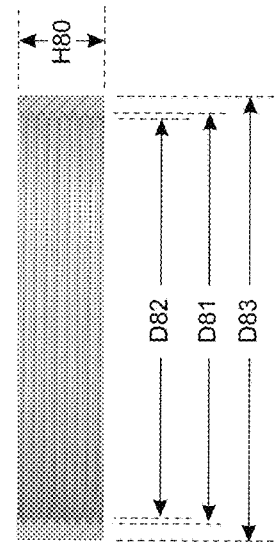
FIG. 62 is a dimensioned cross-sectional view of the lock nut for the fish trap insert.
Figure 59:
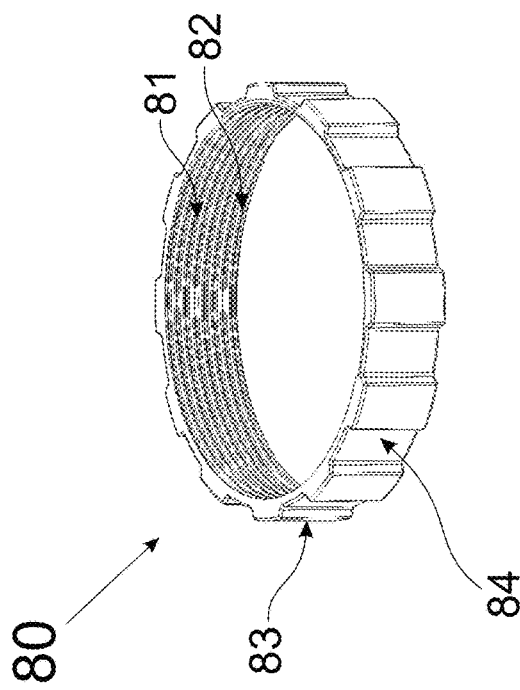
FIG. 59 is a perspective view of the lock nut for the fish trap insert.
Figure 61:
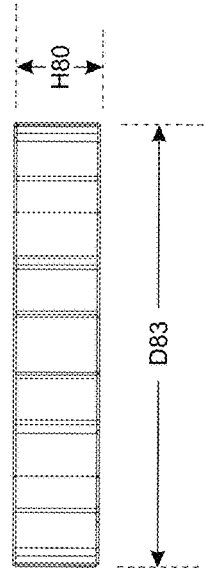
FIG. 61 is a dimensioned side view of the lock nut for the fish trap insert.
Figure 63:
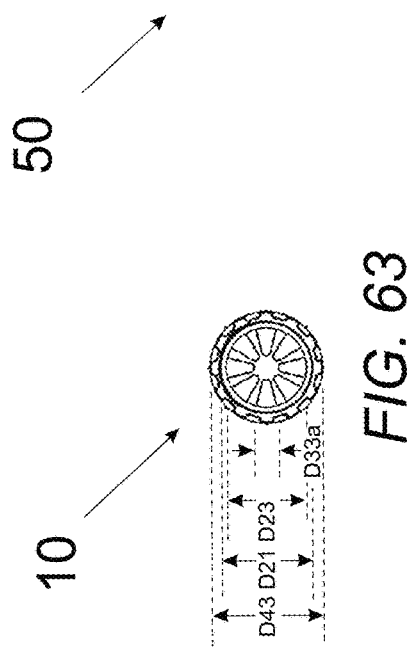
FIG. 63 is a dimensioned bottom view of the present invention.
Figure 65:
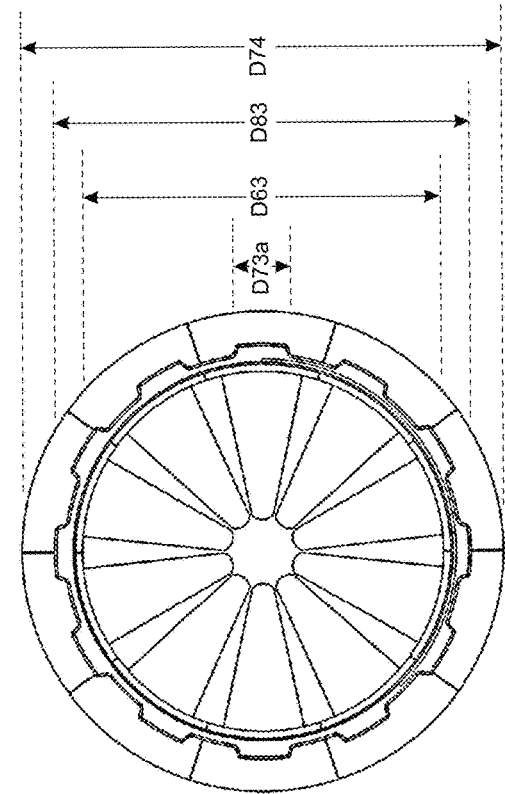
FIG. 65 is a dimensioned bottom view of the present invention.
Figure 64:
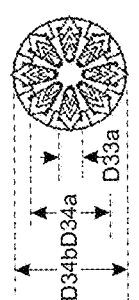
FIG. 64 is a dimensioned top view of the present invention.
Figure 66:
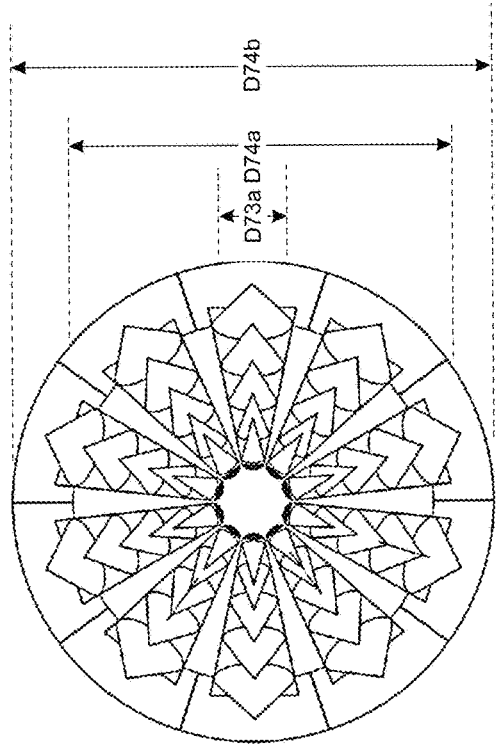
FIG. 66 is a dimensioned top view of the present invention.

FIG. 29 illustrates a completed small rodent trap 90b, demonstrating how two inserts can be installed on a 5-gallon tote for multiple entry points. FIG. 32 illustrates a high-capacity rodent trap 100c made from a 27-gallon tote with eight inserts installed, suitable for a heavy infestation. For aquatic applications, as depicted in FIG. 34, waterproof foam boards 160a, preferably made of durable, closed-cell extruded polystyrene (XPS) 170, are cut to size and placed inside the 170-gallon tote 110a before the lid is secured. This provides substantial buoyancy, allowing the completed trap 110c to float stably on the water's surface as shown in FIG. 36, a configuration ideal for surface-dwelling invasive species. For targeting bottom-dwelling species, the foam is omitted and weights, such as bricks or concrete blocks, can be placed inside the container to make it sink and rest on the substrate.

Figure 15:
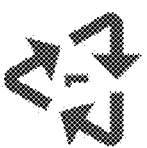
FIG. 15 is a chart showing types of plastics suitable for manufacturing the inserts.
Figure 22:
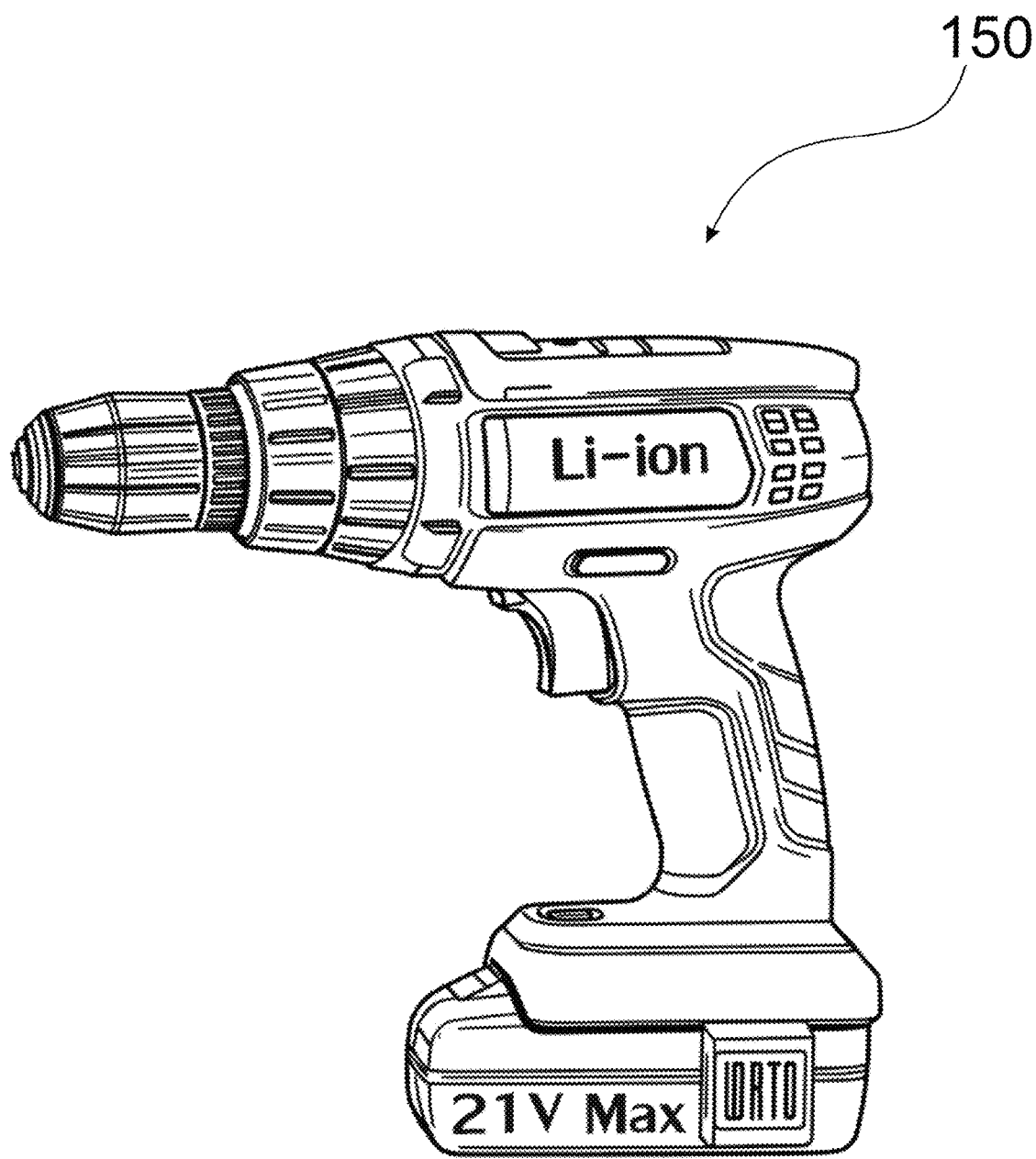
FIG. 22 is a perspective view of a cordless drill used for installation.
Figure 23:
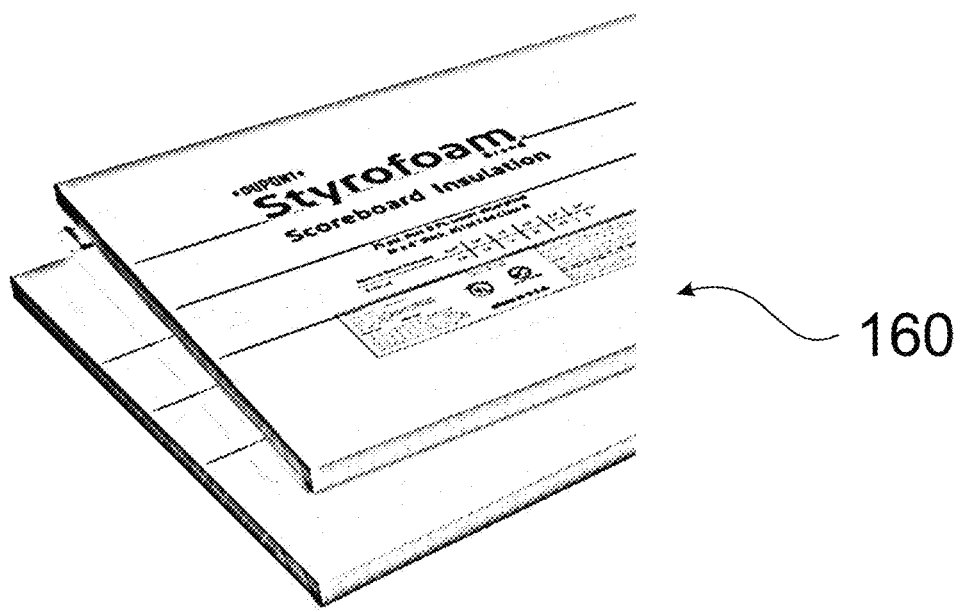
FIG. 23 is a sectional view of foam expanded polystyrene.
Figure 24:
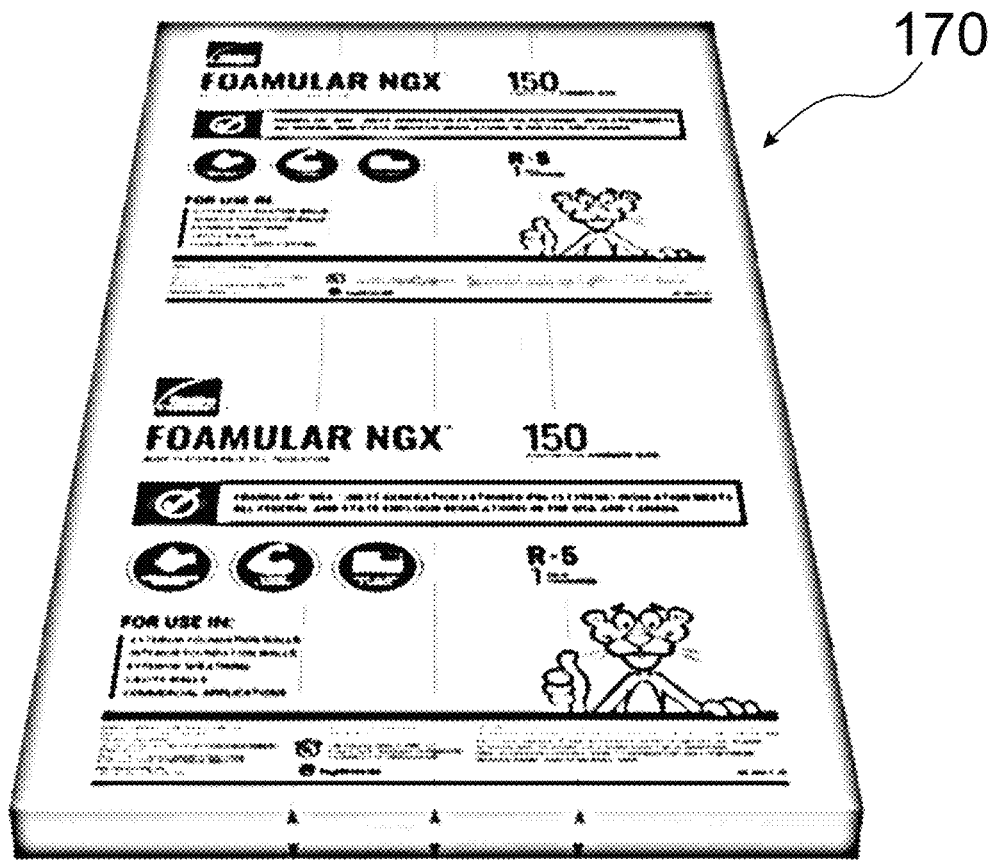
FIG. 24 is a perspective view of extruded polystyrene foam used for flotation according to the present invention.

As detailed in the chart of FIG. 15, the components are preferably manufactured from a rigid, durable, and weather-resistant plastic capable of holding a sharp point and withstanding environmental exposure. Materials such as Polypropylene (PP, Category 5) offer excellent rigidity and fatigue resistance, making them ideal for the snap-fit mechanism. High-Density Polyethylene (HDPE, Category 2) provides superb durability and impact resistance. Polyethylene Terephthalate (PET, Category 1) is also suitable due to its stiffness and strength. The choice of such materials ensures the longevity and reliable performance of the trap in both terrestrial and aquatic environments.

While the invention herein disclosed has been described by means of specific embodiments and applications thereof, numerous modifications and variations could be made thereto by those skilled in the art without departing from the scope of the invention set forth in the claims.

I claim:

1. A pest-prevention assembly comprising:
   a flange body having an external thread and a central opening;
   a flange extending radially outward from a distal end of the flange body for engaging a container surface;
   a plurality of slots distributed around the circumference of the flange body;
   a plurality of spike elements, each spike element including a base configured to interlock with a corresponding slot and an elongated body terminating in a pointed end, the plurality of spike elements collectively forming an inwardly-projecting barrier that permits entry into the container while obstructing exit; and
   a lock nut having an internal thread configured to mate with the external thread of the flange body, the lock nut being operable to secure the flange body to the wall of the container.

2. The pest-prevention assembly of claim 1, wherein the flange body is cylindrical.

3. The pest-prevention assembly of claim 1, wherein the flange further comprises a plurality of teeth extending therefrom, the teeth configured to grip the container surface to prevent rotation of the flange body.

4. The pest-prevention assembly of claim 1, wherein the elongated body of each spike element is tapered from the base to the pointed end.

5. The pest-prevention assembly of claim 1, wherein the base of each spike element and its corresponding slot are configured with a snap-fit interlocking mechanism.

6. The pest-prevention assembly of claim 1, wherein the lock nut includes a textured outer surface to facilitate hand-tightening.

7. The pest-prevention assembly of claim 1, wherein the cylindrical flange body has an external thread diameter of approximately 3 inches, suitable for a rodent trap.

8. The pest-prevention assembly of claim 1, wherein the cylindrical flange body has an external thread diameter of between 6 inches and 36 inches, suitable for a fish trap.

9. The pest-prevention assembly of claim 1, wherein the flange body, spike elements, and lock nut are integrally molded from a plastic material.

10. The pest-prevention assembly of claim 9, wherein the plastic material is selected from the group consisting of Polypropylene (PP), Polyethylene (PE), and Polyethylene terephthalate (PET).

11. A pest-prevention assembly for constructing a rodent trap, comprising:
    a cylindrical flange body having an external thread with a major diameter of approximately 3 inches and a central opening defining an entry diameter of approximately 2.5 inches;
    a flange extending radially outward from a distal end of the flange body, said flange including a plurality of teeth configured to grip an exterior container surface to prevent rotation;
    a plurality of slots distributed around the circumference of the flange body;
    a plurality of individual spike elements, each spike element including a base configured to interlock with a corresponding slot and an elongated, tapered body terminating in a pointed end, the plurality of spike elements collectively forming an inwardly-projecting conical barrier that permits rodent entry while obstructing exit; and
    a lock nut having an internal thread configured to mate with the external thread of the flange body and a textured outer surface to facilitate hand-tightening, the lock nut being operable to secure the flange body to a wall of a container.

12. The pest-prevention assembly of claim 11, wherein the base of each spike element and its corresponding slot are configured with a snap-fit interlocking mechanism.

13. The pest-prevention assembly of claim 11, wherein the flange body, spike elements, and lock nut are molded from a plastic material.

14. The pest-prevention assembly of claim 13, wherein the plastic material is selected from the group consisting of Polypropylene (PP), Polyethylene (PE), and Polyethylene terephthalate (PET).

15. The pest-prevention assembly of claim 11, in combination with a container having a wall defining an aperture, wherein the flange body is installed in said aperture and secured by said lock nut, and wherein the conical barrier projects into an interior volume of said container.

16. A method for repurposing a commercially available storage container into a pest trap using a standard power drill and hole saw, comprising the steps of:
    selecting a commercially available storage container having an interior volume and at least one wall;
    creating a circular aperture of a predetermined diameter through the wall of said container using a standard hole saw bit attached to a power drill;
    inserting a modular flange body, having an external thread dimensioned to correspond with said predetermined diameter, through said aperture from an exterior of the container;
    assembling an inwardly-projecting conical barrier by attaching a plurality of discrete spike elements to the flange body from an interior of the container; and
    securing the flange body to the wall of the container by threading a lock nut onto the external thread from the exterior of the container.

17. The method of claim 16, wherein the commercially available storage container is a plastic storage tote with a capacity ranging from 5 gallons to 170 gallons.

18. The method of claim 16, wherein the step of creating a circular aperture is performed using a 3-inch diameter hole saw bit to prepare the container for a rodent trap assembly.

19. The method of claim 16, wherein the step of creating a circular aperture is performed using an adjustable circular cutter to create an aperture with a diameter between 6 inches and 36 inches to prepare the container for a fish trap assembly.

20. The method of claim 16, further comprising the step of placing a buoyant material within the interior volume of the container to enable the trap to float on water.

* * * * *